(12) United States Patent
Miyazaki et al.

(10) Patent No.: US 8,189,980 B2
(45) Date of Patent: May 29, 2012

(54) ELECTROMAGNETIC WAVE RESONATOR, METHOD OF MANUFACTURING THE SAME, AND METHOD OF RESONATING ELECTROMAGNETIC WAVE

(75) Inventors: Hideki Miyazaki, Ibaraki (JP); Yoichi Kurokawa, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 633 days.

(21) Appl. No.: 11/885,368

(22) PCT Filed: Feb. 24, 2006

(86) PCT No.: PCT/JP2006/303490
§ 371 (c)(1),
(2), (4) Date: Jul. 21, 2009

(87) PCT Pub. No.: WO2006/093056
PCT Pub. Date: Sep. 8, 2006

(65) Prior Publication Data
US 2009/0295510 A1 Dec. 3, 2009

(30) Foreign Application Priority Data
Mar. 1, 2005 (JP) ................. 2005-055512

(51) Int. Cl.
G02B 6/10 (2006.01)
H01S 3/00 (2006.01)
H01L 21/00 (2006.01)
H01P 7/10 (2006.01)
H01P 11/00 (2006.01)

(52) U.S. Cl. ............ 385/131; 385/12; 385/14; 385/129; 385/130; 359/342; 359/346; 438/29; 438/31; 333/219.2; 29/600

(58) Field of Classification Search ............. 385/12, 385/14, 129, 130, 131, 132, 141, 122; 359/342, 359/343, 344, 345, 346; 438/29, 31; 372/6, 372/7; 333/219.2; 29/600
See application file for complete search history.

(56) References Cited

U.S. PATENT DOCUMENTS

| 4,576,777 | A  | * | 3/1986 | Weber | 376/153 |
| 6,850,131 | B2 | * | 2/2005 | Kundu | 333/202 |
| 2003/0025577 | A1 | * | 2/2003 | Kundu | 333/202 |
| 2009/0295510 | A1 | * | 12/2009 | Miyazaki et al. | 333/219.2 |

FOREIGN PATENT DOCUMENTS

JP 7-120636 5/1995
JP 9-61759 3/1997

OTHER PUBLICATIONS

Takakura, Y., Optical Resonance in a Narrow Slit in a Thick Metallic Screen, Physical Review Letters, vol. 86, No. 24, (Jun. 2001), pp. 5601 to 5603.

(Continued)

*Primary Examiner* — Brian Healy
(74) *Attorney, Agent, or Firm* — Hamre, Schumann, Mueller & Larson, P.C.

(57) ABSTRACT

The present invention provides an electromagnetic wave resonator that is capable of showing surface wave resonance typically as outstanding plasmon resonance and can be manufactured industrially with excellent reproducibility and efficiency by combining currently available microprocessing technologies. The electromagnetic wave resonator of the present invention includes a first negative dielectric surface, a second negative dielectric surface and a positive dielectric thin film disposed between the first and the second negative dielectric surfaces. The positive dielectric thin film has an end face having an electromagnetic wave introduced therefrom. Intensity of the electromagnetic wave having a predetermined wavelength and being introduced from the end face is enhanced in the electromagnetic wave resonator due to resonance of a surface wave having an electric field component in a direction of film thickness of the positive dielectric thin film and without having a cut-off frequency.

32 Claims, 14 Drawing Sheets

OTHER PUBLICATIONS

Astilean, S. et al., Light transmission through metallic channels much smaller than the wavelength, Optics Communications, 175 (Mar. 2000), pp. 265 to 273.

"Transmission and focusing of light in one-dimensional periodically nanostructured metals", Garcia-Vidal et al., Physical Review B 66, 155412 (2002), pp. 1-10.

* cited by examiner (a)

(b)

(a)

(b)

(a)

(b)

ELECTROMAGNETIC WAVE RESONATOR, METHOD OF MANUFACTURING THE SAME, AND METHOD OF RESONATING ELECTROMAGNETIC WAVE

TECHNICAL FIELD

The present invention relates to an electromagnetic wave resonator used for enhancing an electromagnetic field in a frequency range including microwaves, millimeter waves, terahertz waves, infrared rays, visible rays and ultraviolet rays, the resonator having dimensions about the same as or more minute than the wavelength.

BACKGROUND ART

Electromagnetic wave resonators are essential for generating and amplifying of coherent electromagnetic waves, wavelength selection, highly sensitive detection of an electromagnetic wave due to enhancement of an electromagnetic field, and exhibiting various non-linear effects.

With respect to light such as infrared rays, visible rays and ultraviolet rays, conventional resonators are composed of geometric optical elements and have much larger volumes than those of the wavelengths. A typical example of them is a laser oscillator composed of dielectric multilayer mirrors. In recent years, however, researches and developments have been carried out seeking resonators with a small volume. This is because a quantum electrodynamic effect is expected in resonators as small as the size of wavelengths. The intensity of such effect is indicated by the Purcell factor. The Purcell factor is proportional to a Q value and inversely proportional to a resonator volume. The Q value is an index indicating energy stored in a resonator or degree of electric field enhancement. Arguments based on the factor are applicable to subjects such as change in fluorescence relaxation and also to enhancing effect on Raman scattering due to the electric field enhancement. In order to obtain a large Purcell factor, it is important to confine a strong electromagnetic field to a small volume. It should be noted that the subjects discussed here are not limited to those in a narrow sense referred to as the Purcell effect.

In the region of radio waves, thin sticks of perfect conductor having a length of about half to the wavelength have been known for some time that they function as a type of resonator localizing electromagnetic waves, and they have been used as antennas. In the region of microwaves, confinement to a wave length space by cavity resonators, i.e. high efficiency reflection with perfect conductors, has been used for some time.

In the light range having visible light at the center, wave length resonators were realized only recently.

The first form of them is a dielectric microsphere. An extremely large Q value was achieved due to a low-loss propagating mode circulating around the equator during total reflection, called the whispering gallery mode. However, confinement by a microsphere about the same in size to a wavelength is so weak that the microsphere does not work as a good resonator. Since a sphere with a relatively large diameter from several times to several tens of times the wavelength has to be employed for obtaining a large Q value, the volume cannot be very small.

The second form is a photonic crystal resonator. A photonic crystal is a two or three dimensional dielectric multilayer mirror. A lattice defect intentionally built in an environment where light cannot propagate in any direction due to a periodic structure achieves a condition in which light localizes only in the defect spot, and thus the neighboring area of the defect functions as a resonator. The size of the confined area is, however, reduced to only about Wavelength/(2×Refractive Index).

Surface plasmons are known as a factor in light propagation. Although the term surface plasmon is a designation from a perspective of particle picture, classical electromagnetic plasma waves are the actual subject for arguments. Surface plasmons are caused by a surface wave localized at an interface and exponentially attenuated as it leaves from the interface, and observed in metals in which the real part of each dielectric constant has a negative value in a range from visible light to infrared light. Since a component perpendicular to the interface has an imaginary value among the three components of wave vector, the other two components have larger values than those in free space. That is, the wavelength is shorter than that of a light wave propagating in a space. The wavelength is determined by the dielectric properties as well as the structure of the material, and even shorter wavelengths can be realized.

An example of surface plasmon in metal provided with a slit is reported in the following reference: F. J. Garcia-Vidal et al., "Transmission and focusing of light in one-dimensional periodically nanostructured metals", Physical Review B, 66, 155412 (2002).

DISCLOSURE OF INVENTION

As described in the above reference, it is known that surface plasmon resonance occurs in periodic nano apertures. A resonator for developing the surface plasmon resonance is so minute as not to be realized by other techniques. Having small absorption loss of light, particularly metals such as silver, gold, copper and aluminum also can achieve large Q values.

For example, spherical or rod-like nanoparticles of metals such as silver and gold, or aggregates of such nanoparticles, show plasmon resonance. In particular, resonance in a nanoparticle aggregate is far more outstanding than that in a single nanoparticle. Such resonance is, however, incidentally formed by random aggregation of the particles, and the reproducibility and the reliability are insufficient. Accordingly, the plasmon resonance in the nanoparticle system cannot be used easily as a resonator.

For realizing a resonator using surface plasmons, it is important to form a slit with a narrow gap. Surface plasmons in periodic nano apertures are, however, under theoretical review, and how to achieve an extremely narrow (for example, about 1 nm of) gap industrially has not yet discussed. Currently, narrow slits are fabricated by combination of patterning based on lithography and etching or by direct etching such as focused ion beam, and a feasible gap size is limited to several tens of nanometers at the minimum. Moreover, no consideration has been made on specific structures suitable for a resonator using surface plasmons.

Surface plasmons are just an example of various forms of surface waves. The ranges of millimeter waves, terahertz waves and far infrared rays, in which other surface waves are observed, are unexplored frequency ranges where various applications are expected in future. In spite of that, the idea based on the perfect conductor in a radio wave range simply is downscaled for application in these frequency regions, and there is no argument focusing on what sort of a resonator is really suitable for them.

An object of the present invention is to provide a resonator that can show surface wave resonance typically as outstanding plasmon resonance and that can be industrially manufactured with excellent reproducibility and efficiency by combining microprocessing techniques currently available.

Another object of the present invention is to provide a method of manufacturing the resonator and a method of resonating an electromagnetic wave.

The present invention provides an electromagnetic wave resonator, including a first negative dielectric surface, a second negative dielectric surface and a positive dielectric thin film disposed between the first and the second negative dielectric surfaces. The positive dielectric thin film has an end face having an electromagnetic wave introduced therefrom. The intensity of the electromagnetic wave having a predetermined wavelength and being introduced from the end face is enhanced in the electromagnetic wave resonator due to the resonance of a surface wave having an electric field component in a direction of film thickness of the positive dielectric thin film and without having a cut-off frequency.

Another aspect of the present invention provides an electromagnetic wave resonator, including a first negative dielectric surface, a second negative dielectric surface and a positive dielectric thin film disposed between the first and the second negative dielectric surfaces. The positive dielectric thin film has an end face having an electromagnetic wave introduced therefrom. A length L, the length L being a length in a principal direction of propagation of the electromagnetic wave in a region having the positive dielectric thin film sandwiched between the first and the second negative dielectric surfaces, is set such that the absolute value of a difference $(L-L_0)$ between the length L and a length $L_0$ falls within a range of 50% or less of the length $L_0$, the length $L_0$ being a length in the principal direction of propagation and the length $L_0$ maximizing electromagnetic energy which is stored in and around the positive dielectric thin film by a surface wave, the surface wave being generated by incidence of an electromagnetic wave with a predetermined wavelength from the end face, having an electric field component in a direction of film thickness of the positive dielectric thin film, and without having a cut-off frequency.

Still another aspect of the present invention provides a method of resonating an electromagnetic wave having a predetermined wavelength using an electromagnetic wave resonator, the resonator comprising a positive dielectric thin film disposed between a first and a second negative dielectric surfaces, the method including, introducing the electromagnetic wave from an end face of the positive dielectric thin film to the electromagnetic wave resonator, so as to generate a surface wave in the electromagnetic wave resonator, the surface wave having an electric field component in a direction of film thickness of the positive dielectric thin film and without having a cut-off frequency and to enhance intensity of the electromagnetic wave in the electromagnetic wave resonator due to resonance of the surface wave.

The present invention realizes a structure equivalent to a nano aperture with a positive dielectric thin film. A film thickness of the positive dielectric thin film can be controlled precisely by an industrial method excellent in reproducibility and efficiency. The present invention provides an industrially mass producible resonator using surface waves, typically surface plasmons. The present invention is applicable to resonators and resonance methods using various surface waves in wavelength ranges, not only visible light, infrared light and ranges around the light, but also microwaves, millimeter waves, terahertz waves and far infrared rays, for example.

BRIEF DESCRIPTION OF DRAWINGS

FIG. 3(a) shows the structure and the distribution of an open resonator in contrast with FIG. 3(b) showing those of a closed resonator.

BEST MODE FOR CARRYING OUT THE INVENTION

Basic Principle

The basic physics behind the electromagnetic wave resonator of the present invention is resonance, caused by reflection of a surface wave propagating mode in a slab waveguide on an end face of the waveguide. The slab waveguide has a slit with a narrow gap disposed between claddings made of a negative dielectric material. Preferably the slab waveguide has a limited length about the same as that of a wavelength of the surface wave. The point for industrial realization of the slab waveguide having a narrow gap slit disposed between claddings made of a negative dielectric material is to realize the slit required to have an extremely narrow gap by adding a thin film, not by removing as conventional art.

In this description, a positive dielectric means a dielectric in which the dielectric constant has a positive real part and a negative dielectric means a dielectric in which the dielectric constant has a negative real part. General nonmetal materials, such as glass, ceramics, semiconductors, polymers and liquids, are applicable for the positive dielectric. According to the definition above, air, other gasses and even a vacuum space also may be referred to as the positive dielectric. In contrast, the negative dielectric is made of a specific material, having the characteristic described above only in a specific frequency band. Typical examples include metal materials in the ranges lower than plasma frequencies, i.e. ranges of visible light and infrared light. The examples include materials exhibiting resonance of a large lattice vibration such as silicon carbide and various ionic crystals in the ranges from far infrared light to terahertz waves superconductive materials under a superconductive condition in the ranges lower in frequency than the superconductive energy gap from terahertz waves to microwaves, and semiconductor materials, such as silicon, with their carriers excited.

Although the description below mainly discusses electromagnetic waves in and around the visible light range commonly referred to as light, the present invention is applicable to a wide range of electromagnetic waves such as microwaves and terahertz waves by using a material appropriately selected for a frequency band to conform with a wavelength of an electromagnetic wave in the bandwidth.

Figure 1:
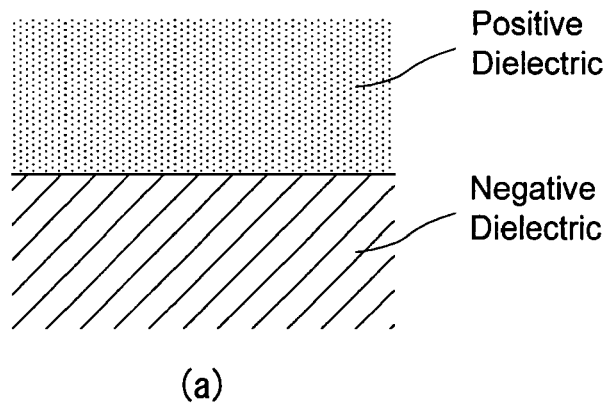
FIG. 1(a) is a schematic view showing an interface of a negative dielectric and a positive dielectric.
FIG. 1(b) is a chart for showing dispersion characteristics of a surface wave mode propagating along the interface.
Figure 1:
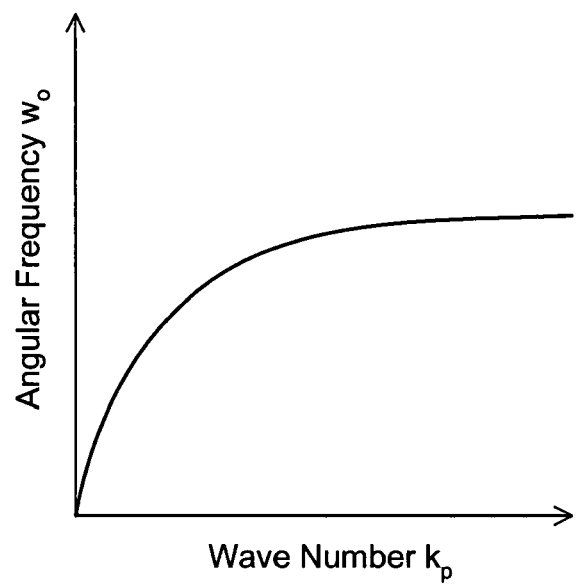

At an interface between a negative and a positive dielectrics (FIG. 1(a)), a surface wave mode generally exists that has an electric field perpendicular to the interface, has electromagnetic field distribution in which the electromagnetic field is maximum at the interface and exponentially attenuated with distance from the interface, and propagates along the surface. Such surface wave propagates a longer distance particularly when using a material having a smaller imaginary part in the dielectric constant. The surface wave in the case of employing a metal material for the negative dielectric is the surface plasmon mentioned above.

Wavelengths of such surface waves often are considered in relation to dispersion curves. Dispersion curves are indicated in general with the horizontal axis representing a wave number $k_P$ and the vertical axis representing an angular frequency $\omega_0$ (FIG. 1(b)). A wave number is proportional to the reciprocal of a wavelength $\lambda_P$ of a surface wave, and expressed as $k_P=2\pi/\lambda_P$. On the other hand, an angular frequency is proportional to a reciprocal of a wavelength of the electromagnetic wave propagating in a vacuum (a vacuum wavelength) $\lambda_0$, and expressed as $\omega_0=2\pi c/\lambda_0$. In this expression, c denotes the speed of light in a vacuum. The shape of a dispersion curve is determined by dielectric properties of the negative and the positive dielectrics, and a dispersion curve of a common metal material in the range from visible to infrared light is in the shape shown in FIG. 1(b).

The curve is expressed specifically as $k_p^2=(\omega_0/c)^2\times\in_d\in_m/(\in_d+\in_m)$. In this expression, $\in_d$ and $\in_m$ denote dielectric constants of the positive dielectric and the negative dielectric, respectively.

Figure 2:
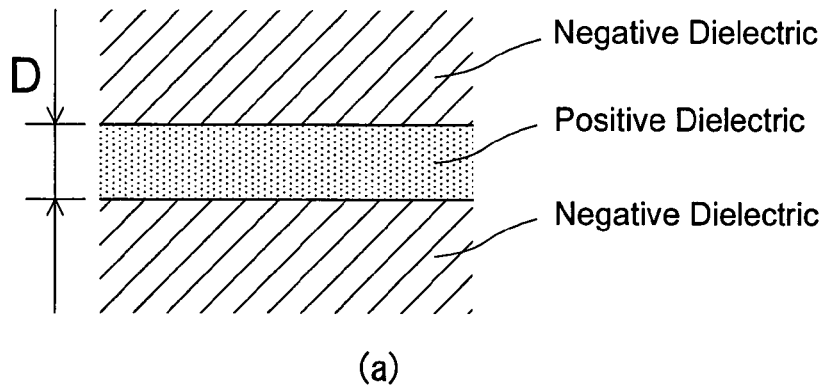
FIG. 2(a) is a schematic view showing a slab waveguide with a negative dielectric for a cladding and a positive dielectric for a core.
FIG. 2(b) is a chart for showing dispersion characteristics of a surface wave mode propagating along the waveguide.
Figure 2:
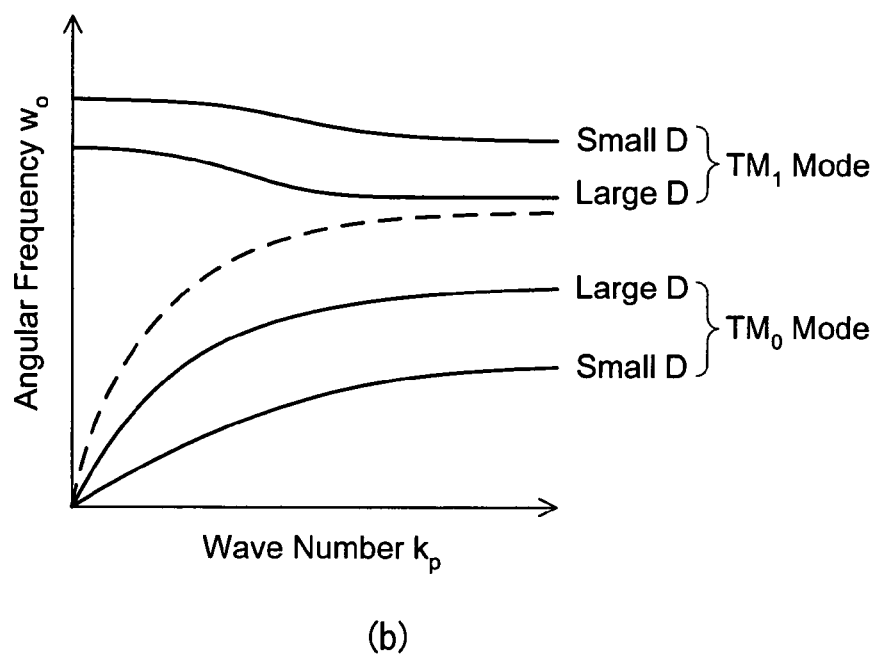

Next, a slab waveguide having a negative dielectric as a cladding and a positive dielectric as a core (FIG. 2(a)) is discussed. In this system, surface wave modes at two interfaces interact with each other to be divided into a bonding mode and an antibonding mode. This is shown in the dispersion curves in FIG. 2(b). The broken line is the dispersion curve in FIG. 1(b) and is divided into upward and downward. The antibonding mode ($TM_1$ mode) is illustrated by the upper curves and the bonding mode ($TM_0$ mode) by the lower curves.

These curves are obtained specifically as solutions for Equation 1 below:

$$(1-R)/(1+R)=\pm\exp(K_d D),\quad\text{(Equation 1)}$$

wherein $$K_d^2=k_p^2-(\omega_0/c)^2\times\in_d,$$

$$K_m^2=k_p^2-(\omega_0/c)^2\times\in_m,\text{ and}$$

$$R=-\in_d K_m/(\in_m K_d).$$

The present invention uses a $TM_0$ mode among surface wave modes. Definitions of terms such as $TM_0$ may vary with technical fields. However, the mode mentioned as a $TM_0$ mode in this description can be specified by expressing it as a mode having an electric field component perpendicular to an interface between a positive dielectric and a negative dielectric and without having a cut-off frequency, no matter what technical field is applied for the description. Here, the cut-off frequency means an angular frequency $\omega_0$ that determines a boundary for the lower limit of propagation and the mode cannot propagate in a lower frequency range. Dispersion curves of modes having a cut-off frequency, as shown as the $TM_1$ mode in FIG. 2(b), begin at a point other than zero on the vertical axis. On the contrary, dispersion curves of the $TM_0$ mode begin at the origin. The $TM_0$ mode is the sole mode that does not have a cut-off frequency among the surface wave modes of a slab waveguide having a negative dielectric as a cladding and a positive dielectric as a core.

A wavelength $\lambda_P$ of the surface wave in the bonding mode ($TM_0$ mode) becomes shorter as a core thickness D becomes smaller, which means that the wave number becomes larger. Selecting a smaller D enables realizing a $\lambda_P$ as small as from one severalth to one several-tenth the wavelength $\lambda_0$ in vacuum. Although this range is equivalent to the wavelengths of electromagnetic waves in materials having a refractive index of some tens, a material having such a huge refractive index is not known in reality. That is, a $\lambda_P$ as small as that not obtainable by enlarging a refractive index is realized by the slab waveguide having a negative dielectric as a cladding and having a minute core thickness D.

Since a surface wave in the bonding mode has symmetry of the electromagnetic field same as a plane wave, the surface wave easily can be excited only by emitting a plane wave to a waveguide end face. An electromagnetic wave also can be emitted from an end face to a space. An electromagnetic wave generally has certain distribution of angles for introducing and outgoing to/from a resonator, and the average direction of propagation is referred to as a principal direction of propagation in this description.

Upon reaching an end face of a waveguide, such surface wave is reflected to return in the waveguide. The reflectance here becomes higher for a smaller core thickness D. The phase of the reflection relative to the incident wave is determined by the condition of the end face. In the case of an edge of an end face covered with a positive dielectric (referred to as an open end), the wave is reflected in a phase where the electric field becomes maximal at the end face. In the case of an end face of a waveguide covered with a negative dielectric (referred to as a closed end), the wave reflects in a phase where the electric field becomes zero at the end face.

Figure 3:
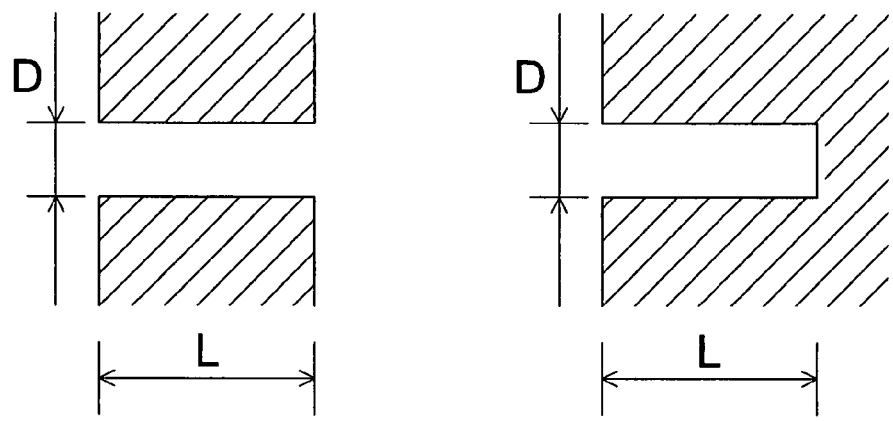
FIG. 3 is a chart for showing a schematic structure and electric field distribution during resonance, where
Figure 3:
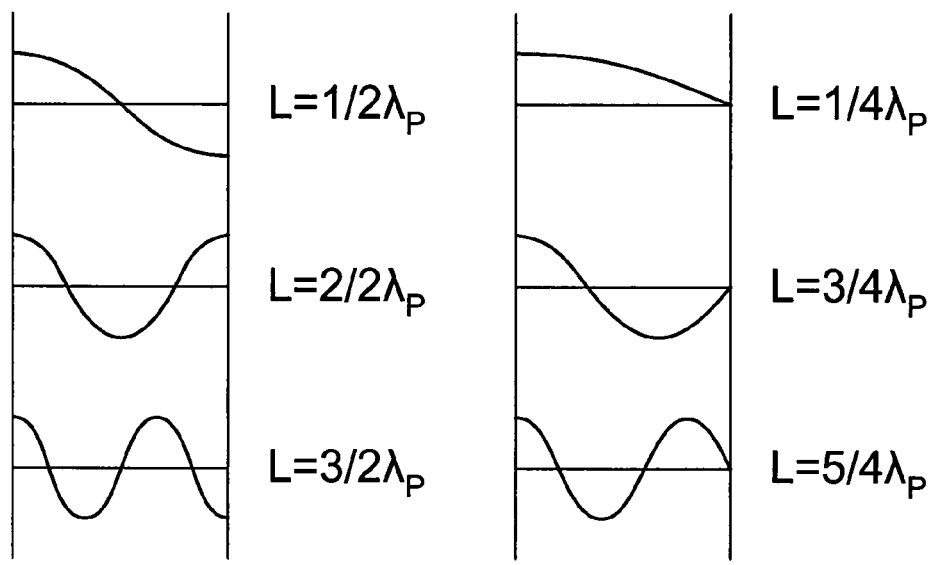

Accordingly, when the both ends in a direction of propagation are open ends, a surface wave having discrete wavelengths $\lambda_P$ resonates in which a length L of the waveguide in the principal direction of propagation equals to $(1/2)\lambda_P$, $(2/2)\lambda_P$, $(3/2)\lambda_P\ldots$ (FIG. 3(a)). That is, such waveguide behaves as a resonator for a surface wave having these wavelengths. Hereinafter, this is referred to as an open resonator. On the other hand, when one of the ends is an open end and the other is a closed end, a resonator for a surface wave having discrete wavelengths $\lambda_P$ is constructed in which a length of the waveguide equals to $(1/4)\lambda_P$, $(3/4)\lambda_P$, $(5/4)\lambda_P\ldots$ (FIG. 3(b)). This is referred to as a closed resonator. Since an open resonator may discharge an electromagnetic wave from both end faces to the outside, such resonator causes significant losses. From the perspective of resonance losses, a closed resonator generally functions better than an open resonator.

In practice, the electric field at an open end and a closed end does not become exactly maximal or zero, but it spreads out to some degree. To cope with this, some correction is required for the design. The waveguide length $L_0$ where the electromagnetic wave having the objective vacuum wavelength $\lambda_0$ resonates is obtained precisely by the following manner: exactly calculating Maxwell's equations by a calculation method such as the boundary element method, and thus finding a condition in which the electromagnetic energy that is stored inside the positive dielectric core and the neighboring areas becomes maximal.

Figure 4:
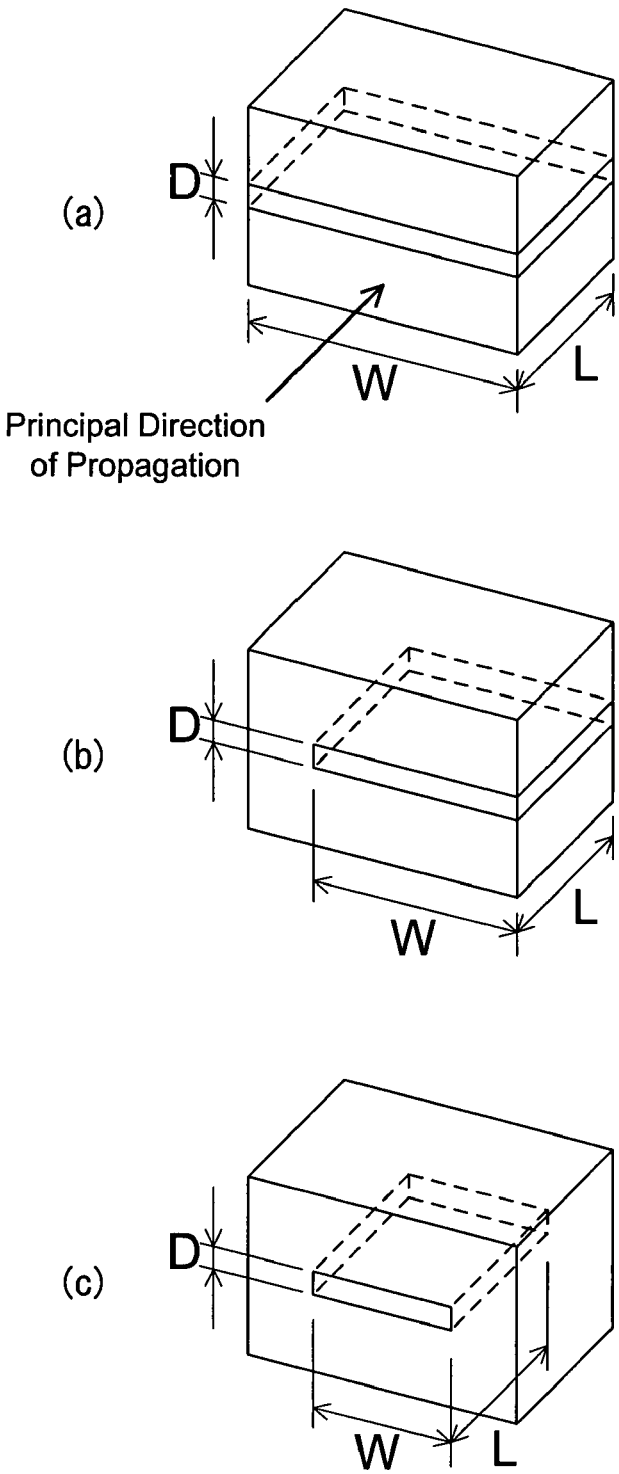
FIGS. 4(a) to 4(c) are perspective views, each illustrating an example of a structure of the open resonator.
Figure 5:
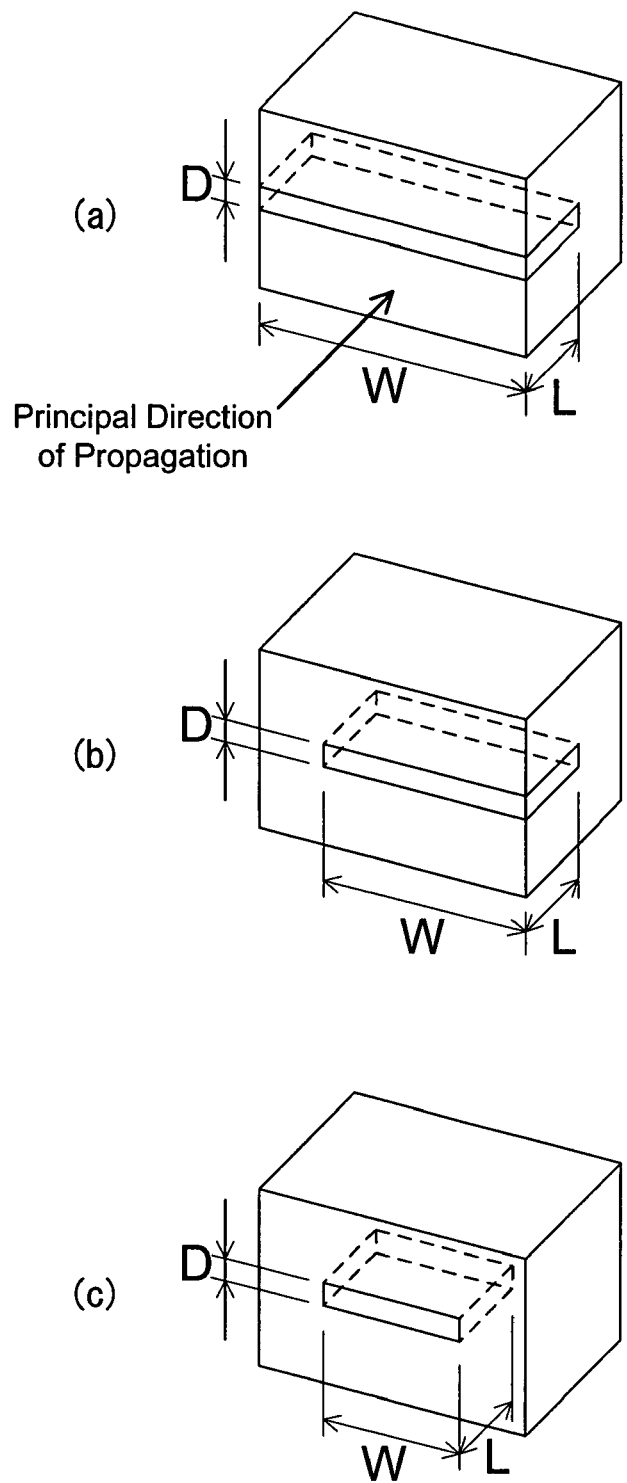
FIGS. 5(a) to 5(c) are perspective views, each illustrating an example of a structure of the closed resonator.

Here, side faces of the core parallel to the propagation direction are preferably open ends for efficiently realize the resonance described above in a direction of propagation. When the side faces are open ends, resonance is generated without particular condition in a distance W between the side faces. Particularly when the waveguide length L has a length corresponding to a first resonance relative to the objective $\lambda_0$ and the W also has a dimension as small as the $\lambda_0$, this resonator becomes a single mode resonator and a high quality minute resonator that can excite a specific mode efficiently with a smallest volume. As another form, when the distance W between the side faces is half or more of the vacuum wavelength $\lambda_0$, the resonator can excite a resonance relatively efficiently even with the side faces being closed ends. FIGS. 4(a) to 4(c) and FIGS. 5(a) to 5(c) illustrate specific examples of structures drawn from the conditions mentioned above. FIGS. 4(a) to 4(c) are examples of open resonators, and FIGS. 5(a) to 5(c) are examples of closed resonators.

As described above, the resonance due to reflection at an end face in a $TM_0$ mode of a slab waveguide having a negative dielectric as a cladding and a positive dielectric as a core provides a small resonator, easily interacts with the ambient and exhibits outstanding resonance, which makes it an ideal minute resonator. In particular, a core thickness D being 1/10 or less of the vacuum wavelength $\lambda_0$ enables a sufficiently small wavelength $\lambda_P$ to be obtained in addition to a high electric field. This mode has been historically out of attention due to its propagation loss larger than other modes, such as $TE_0$. This is why methods for realizing a minute resonator as simple as that of the present invention have been ignored for a long time. The loss, however, does not cause a serious problem because only a short distance of propagation, as short as a fraction of a wavelength or for several wavelengths at maximum, is to be considered for a minute resonator.

Actually, the plasmon resonance at a particle contact point of aggregates of silver or gold nanoparticles, which has been researched actively, also can be considered as resonance, between the two open ends, in a bonding mode of a slab waveguide having each particle as a negative dielectric cladding and each gap between the particles as a positive dielectric core. Resonance conducted at a contact point also can be understood in the same way by considering as a formation of a closed resonator. Another aspect of the present invention provides guidelines for designing a structure that extracts a fundamental mechanism of the huge resonance incidentally formed in aggregates of silver or gold nanoparticles to reproduce the resonance artificially under optimum conditions.

[Structure of the Resonator]

The resonator of the present invention includes a positive dielectric thin film disposed between the first and the second negative dielectric surfaces, and a region having the positive dielectric thin film sandwiched between the first and the second negative dielectric surfaces. Each negative dielectric providing the first and the second negative dielectric surfaces may be a negative dielectric substrate or a negative dielectric thin film. As described above, the positive dielectric thin film is composed of a material in which the dielectric constant has a positive real part at a wavelength $\lambda_0$, and the negative dielectric is composed of a material in which the dielectric constant has a negative real part at the wavelength $\lambda_0$.

The electromagnetic wave resonator of the present invention uses a $TM_0$ mode among surface wave modes. The surface wave has an electric field component in a direction of film thickness of the positive dielectric thin film and without having a cut-off frequency. It also has a wavelength $\lambda_P$ that is determined by the following factors: 1) a vacuum wavelength $\lambda_0$ of the electromagnetic wave, 2) a thickness D of the positive dielectric thin film, and 3) the dielectric constants of the negative dielectric providing the first negative dielectric surface, the negative dielectric providing the second negative dielectric surface, and the positive dielectric thin film.

In the resonator of the present invention, a length L of the surface wave in a principal direction of propagation of the electromagnetic wave of the positive dielectric thin film is determined according to various conditions. The length L may be determined adequately in a range where the intensity of the electromagnetic wave is enhanced. Although the absolute value of a difference ($L-L_0$) between the length L and the length $L_0$ is preferred to be small, the length L is not necessarily the same as the $L_0$.

The length L, for example, is set such that the absolute value of a difference ($L-L_0$) between the length L and the length $L_0$ falls within a range of 50% or less, preferably 30% or less, more preferably 20% or less, further preferably 10% or less, particularly preferably 7% or less, and most preferably 5% or less of the $L_0$. The length of $L_0$ is a length maximizing the electromagnetic energy stored in and around the positive dielectric thin film by the surface wave in the $TM_0$ mode. The expression, "maximizing the electromagnetic energy" means that a value of the electromagnetic energy indicated as a function of L becomes maximal, and in other words that conditions for surface wave resonance are satisfied when $L=L_0$.

Hereinafter, a preferred structure of the electromagnetic wave resonator of the present invention is described.

The electromagnetic wave resonator of the present invention may be an open resonator, which has two faces determining the length L of the positive dielectric thin film and both uncovered with a negative dielectric. In this case, $L_0$ should be $(n_1/2)\lambda_P$ (refer to FIG. 3(a)), wherein $n_1$ denotes a natural number, preferably a natural number of six or less, more preferably a natural number of three or less, and $\lambda_P$ denotes a wavelength of the surface wave. The faces determining the length L are the faces determining the region having the positive dielectric thin film sandwiched by the first and the second negative dielectric surfaces, and thus the faces are not necessarily identical to end faces of the positive dielectric thin film itself. When the negative dielectric surface sandwiches a part of the positive dielectric thin film, the faces may be equivalent to virtual faces that supposedly exist at the ends, where the state of sandwiching ends, of the negative dielectric surface within the positive dielectric thin film.

The electromagnetic wave resonator of the present invention may be a closed resonator in which the positive dielectric thin film has two faces determining the length L and either one face selected from the two faces is covered with a negative dielectric. In this case, $L_0$ should be $((2n_2-1)/4)\lambda_P$ (refer to FIG. 3(b)), wherein $n_2$ is a natural number, preferably a natural number of six or less, more preferably a natural number of three or less, and $\lambda_P$ is the same as above.

An appropriate value for $L_0$, however, may not become $(n_1/2)\lambda_P$ or $((2n_2-1)/4)\lambda_P$ when using resonators adjacent to each other or forming positive dielectric thin films on a single resonator, and it is described more in detail later.

In the electromagnetic wave resonator of the present invention, two end faces of the positive dielectric thin film both may be covered with a positive dielectric, the two end faces being in a film plane direction of the positive dielectric thin film and in a direction orthogonal to the principal direction of propagation (refer to FIGS. 4(a) and 5(a)) or at least one end face selected from the two end faces may be covered with a negative dielectric (refer to FIGS. 4(b), 4(c), 5(b) and 5(c)). When at least one of the two end faces is covered with a negative dielectric, particularly when both of the two end faces are covered with a negative dielectric (refer to FIGS. 4(c) and 5(c)), the length W of the positive dielectric thin film in the orthogonal direction should be half or more of the vacuum wavelength $\lambda_0$ of the electromagnetic wave.

The electromagnetic wave resonator of the present invention may include two or more positive dielectric thin films for resonating an electromagnetic wave, for example it may include a multilayer structure in which the positive dielectric thin films and two or more negative dielectric thin films are stacked alternately. Employment of such multilayer structure enables resonance for an incident electromagnetic wave emitted to a wider region, resulting in improving utility and even enabling enhancement of the output drawn from the electromagnetic wave resonator.

Although the positive dielectric thin film is preferred to be thin, an excessively thin negative dielectric thin film may cause the electromagnetic field distribution in a surface mode deformed from the ideal form of a $TM_0$ mode or the mode developing greater losses. For this reason, in the electromagnetic wave resonator of the present invention, a thickness of each positive dielectric thin film is determined preferably to be thinner than a thickness of each negative dielectric thin film. Although the thickness of the negative dielectric thin film is not particularly limited, it may be from half to one fold of the $\lambda_p$, for example. It also may be 100 nm or more, for example from 100 nm to 200 nm, when the vacuum wavelength $\lambda_0$ of the electromagnetic wave is in an approximate range from 300 nm to 4 μm.

The electromagnetic wave resonator of the present invention may include a plurality of multilayer structures, each structure being as described as above, and for example it may be an electromagnetic wave resonator including a first multilayer structure and a second multilayer structure and having a first substrate, the first multilayer structure, a junction layer, the second multilayer structure and a second substrate, being stacked in this order. As described later in detail, such construction has an advantage in realizing the length L precisely by polishing.

The electromagnetic wave resonator of the present invention preferably further include a support member joined to at least one end face of the multilayer structure, having two end faces in a principal direction of propagation of the multilayer structure, selected from the two faces. The length L in the principal direction of propagation has to be set minutely and precisely. Such support member as described above is useful to maintain the multilayer structure and even to realize the length L precisely.

Although the first and the second multilayer structures are disposed via the junction layer to be spaced apart in a direction of thickness, disposition of a plurality of multilayer structures is not limited to this layout. The multilayer structure may be disposed, for example, to be spaced apart in a direction orthogonal to the principal direction of propagation (a direction W). That is, the electromagnetic wave resonator of the present invention may have a structure in which, for example, the multilayer structure includes a third multilayer structure and a fourth multilayer structure, and the third and the fourth multilayer structures are supported by the support member to be spaced apart in a layer plane direction of the multilayer structure and in a direction orthogonal to the principal direction of propagation.

The electromagnetic wave resonator of the present invention also may include a plurality of multilayer structures disposed to be spaced apart in two directions orthogonal to the principal direction of propagation. In this case, the plurality of multilayer structures may be disposed in a matrix on a plane orthogonal to the principal direction of propagation, and the plurality of multilayer structures also may be joined and maintained by one support member.

In addition, an assembly of electromagnetic wave resonators may be composed in which the two or more electromagnetic wave resonators described above are aligned, for example in a matrix, on a plane orthogonal to the principal direction of propagation.

Dimensions of the electromagnetic wave resonator of the present invention preferably fall within the following ranges. Although it is obvious from the above description, the dimensions of the electromagnetic wave resonator should be designed appropriately according to a frequency band to be applied, and the ranges listed below are merely for illustration purposes.

The thickness D of the positive dielectric thin film is preferably 1/10 or less, more preferably 1/50 or less and further preferably 1/200 or less of the vacuum wavelength $\lambda_0$ of the electromagnetic wave. A smaller thickness D appears to increase the effect of enhancing the electromagnetic wave. The thickness D of the positive dielectric thin film generally may be 50 nm or less, and preferably 10 nm or less, for example in a range from 0.2 nm to 10 nm. It is preferred to be in a range from 0.2 nm to 5 nm when $\lambda_0$ is in a range from 300 nm to 4 μm, for example.

The length L of the positive dielectric thin film defined in the principal direction of propagation generally may be 1 μm or less, particularly in a range from 1 nm to 500 nm. It is preferred to be in a range from 1 nm to 200 nm when $\lambda_0$ is in the range from 300 nm to 4 μm, for example.

The electromagnetic wave resonator of the present invention may have the length L of about the same range as the vacuum wavelength $\lambda_0$ or more minute than that. The length L may be equal to or less than $\lambda_0$, which means 1/1 of $\lambda_0$ or less, and may be in a range from 1/20 of $\lambda_0$ to 1/3 of $\lambda_0$, for example.

Although the electromagnetic wave resonator of the present invention may be applied for various frequency regions such as microwaves, millimeter waves, terahertz waves, infrared rays, visible rays and ultraviolet rays, it exhibits better utility particularly in a frequency region from 100 nm to 10 mm, indicated by the vacuum wavelength $\lambda_0$. It also shows better utility in a frequency region from 300 nm to 4 μm when selecting a metal material showing plasmon resonance for a negative dielectric material, and in a frequency region from 10 μm to 100 μm when selecting a material, such as silicon carbide, magnesium oxide or sodium chloride, showing surface wave resonance based on phonons as a negative dielectric material.

The length W is not particularly limited, which is a length of the positive dielectric thin film in a film plane direction orthogonal to principal direction of propagation. The length W may be half or more of $\lambda_0$ as described above, and it is preferably in a range from 500 nm to 5 μm, for example.

[Method of Manufacturing an Electromagnetic Wave Resonator]

The electromagnetic wave resonator of the present invention has an advantage of being manufactured precisely by an industrial method. Although such manufacturing method is not particularly limited, the following example may apply for illustration purposes.

For example, the electromagnetic wave resonator of the present invention can be manufactured by a method including steps of forming a positive dielectric thin film on a first negative dielectric surface, forming a negative dielectric thin film on the positive dielectric thin film for providing a second negative dielectric surface, and removing a part of the negative dielectric thin film from a region having the negative dielectric thin film formed thereon. The step of removing the negative dielectric thin film is carried out to define a region having the positive dielectric thin film sandwiched by the first and the second negative dielectric surfaces. In this step, the positive dielectric thin film also may be removed together with the negative dielectric thin film.

The surface to have the positive dielectric thin film formed thereon is not necessarily to be a negative dielectric surface. The electromagnetic wave resonator of the present invention can be manufactured by a method, for example, including steps of forming a first negative dielectric thin film providing a first negative dielectric surface on a positive dielectric thin film, the positive dielectric thin film being formed on a sacrificial substrate, removing the sacrificial substrate so as to expose a surface of the positive dielectric thin film, and forming a second negative dielectric thin film providing a second negative dielectric surface on the exposed surface of the positive dielectric thin film. The positive dielectric thin film may be formed on the sacrificial substrate, and a preformed thin film, such as an oxide film on a surface of a semiconductor substrate, also may be used.

Hereinafter, preferred embodiments of the present invention are described more in detail.

First Example

First Example illustrates an open resonator, in which gold is employed for a dielectric and surface plasmon is used as a surface wave, for an electromagnetic wave in the regions from visible light to infrared light.

Figure 6:
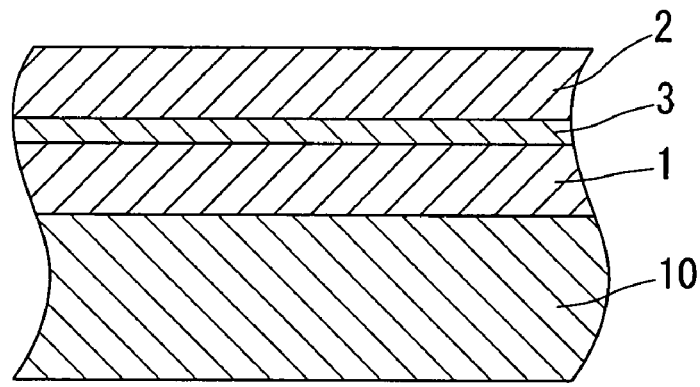
FIGS. 6(a) and 6(b) are cross-sectional views showing steps of manufacturing the electromagnetic wave resonator.
Figure 6:
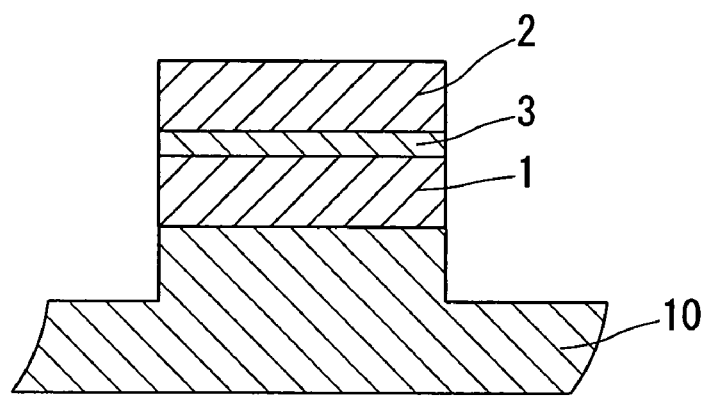

First, as shown in FIG. 6(a), a first negative dielectric thin film 1, a positive dielectric thin film 3, and a second negative dielectric thin film 2 were formed on a substrate 10 in this order. In this Example, a synthetic quartz substrate was employed for the substrate 10. On this substrate, a gold thin film with a thickness of 150 nm as the first negative dielectric thin film 1, a silica ($SiO_2$) thin film with a thickness D as the positive dielectric thin film 3 and a gold thin film with a thickness of 150 nm as the second negative dielectric thin film 2 were stacked.

The gold thin films were formed by DC magnetron sputtering and the silica thin film was formed by high frequency magnetron sputtering. A chromium film with a thickness in a range from 5 nm to 10 nm may be formed as a base film between the synthetic quartz substrate and the first gold thin film as needed. This is intended to enhance the adhesion between the quartz substrate and the gold thin film to the extent not to separate from each other during the processing steps afterward. A chromium film with a thickness in a range from 25 nm to 70 nm further was formed on the outermost layer as a protective film by electrical resistance heating vacuum evaporation for protecting a region not to be removed during an application of focused ion beam later in the procedure.

In this structure, gold functioned as a negative dielectric cladding and silica functioned as a positive dielectric core. Although gold was selected because it has an established sputtering condition and a surface that is chemically stable, other materials also may be used such as aluminum depending on an objective wavelength, or silver or copper.

When visible light or infrared light is supposed to be the frequency region, at least one selected from gold, silver, copper and aluminum is appropriate for the negative dielectric material and various materials are applicable for the positive dielectric material, as illustrated above. For example, at least one selected from silica (silicon oxide), titanium oxide, niobium oxide, aluminum oxide, zinc oxide, tantalum oxide, magnesium oxide, hafnium oxide and magnesium fluoride is appropriate for the positive dielectric material. Even among resonators having the same dimensions, wavelengths developing resonance and degrees of electric field enhancement vary depending on the materials.

The thickness of gold was defined as a thickness enabling the electric field of the surface wave to be decreased sufficiently, where the surface wave was exponentially attenuated from the interface with silica. Although the thickness enabling the electric field of the surface wave to be decreased sufficiently is dependent on factors such as the dielectric constant of the negative dielectric material to be used and the applied wavelength, an example of the thickness may be 100 nm or more.

The surface of a gold thin film is preferably smooth to be employed for the first negative dielectric thin film 1. Since the silica thin film is to be formed along this surface, an overly irregular gold thin film causes the surface wave to be excessively scattered when propagating in the plane. This leads to losses as a resonator and causes a decrease in a Q value.

Although an equivalent resonator originally is obtained only by using gold for the substrate itself and forming single silica thin film and single gold thin film thereon, only the necessary parts were formed of gold in this Example due to the less economical aspect and the difficulty in obtaining a smooth surface. Accordingly, the electromagnetic wave resonator of the present invention may include a substrate (a positive dielectric substrate) 10 and a stacked film formed on the substrate, in which the stacked film may include a stacked structure of a first negative dielectric thin film 1, a positive dielectric thin film 3 and a second negative dielectric thin film 2.

The thickness D of the silica thin film is preferably as small as possible, and each sample fabricated in the experiments in this Example had the thickness D of 56 nm, 14 nm, 3.3 nm and 1.7 nm.

Experimental researches on plasmon resonance have been attempted by prototyping a slit disposed between negative dielectric claddings for laboratory testing. The conventional fabrication strategy, however, was to remove a slit using electron-beam lithography or focused ion beam processing from a metal thin film stacked on a transparent substrate. In this method, the length L of the resonator is determined by the film formation and a slit width D is determined by the removal process. As illustrated with reference to FIG. 2(b), size reduction in the slit width D is fundamentally important for using a large effect on electric field enhancement and realizing a minute resonator.

When a resonance equivalent to aggregates of silver or gold nanoparticles is required for the electromagnetic wave in the regions from visible light to infrared light, the D is required to have a value of 5 nm or less, in particular around 1 nm. The slit width feasible by the currently available techniques, however, is approximately 10 nm even when using a cutting edge device, and only about 50 nm of the slit width has been realized actually in the researches. This is nothing near the required dimension. The degree of electric field enhancement is roughly inversely proportional to the slit width. In the case of D=50 nm, only 1/2500 of enhancement for D=1 nm is obtained in terms of the ratio of intensity, which is defined as the square of the electric field, where the ratio also may be referred to as the ratio of the Purcell factor. From the perspective of seeking for plasmon resonance equivalent to that of an aggregate of silver or gold nanoparticles, this is so small as to be considered to generate no resonance at all.

The point of the present invention is switching the application of film forming technique and removing technique. It is not difficult to control a thickness with a precision of 1 nm or less using the currently available film forming technique. Although a film with a thickness as thin as some nanometers is prone to be formed discontinuous and have an island structure, it is not difficult to form a continuous film with about 1 nm of thickness using a technique for forming a dense film such as magnetron sputtering and ion beam sputtering. Molecular beam epitaxy using a Knudsen cell or laser ablation enables to form a continuous film even with a precision of single atomic layer. This technique enables stacking a layered compound in which an insulating layer (a positive dielectric layer) and a conductive layer (a negative dielectric layer) repeatedly are disposed on each other by controlling at an atomic level.

In addition, although the following technique is still under research, molecules generically referred to as self assembled monomolecular layers have a property of uniform absorption to a metal surface of gold or silver, for example, concentrated with a thickness of single molecule. Specifically, such molecule may be a thiol compound such as 1-decanethiol. It is also known that gold can be further evaporated on this monomolecular layer. This technique can control the film thickness by the unit of angstrom only by selecting an appropriate alkyl chain without using a sophisticated device. Dithiol compounds having a thiol group at the both terminals, such as 1,10-decanedithiol, may be used for enhancing the adhesion with the gold of the upper layer. When using a material such as silver, copper or aluminum as the negative dielectric, the surface of the first negative dielectric thin film may be converted to a compound by a step such as oxidation, nitridation and sulfidation for using it as the positive dielectric thin film.

On the other hand, the length L of the resonator is given as L=11 nm even when assuming a typical strict condition of a first mode for a vacuum wavelength $\lambda_0$=700 nm of an open resonator having D=1 nm. In the case of the second or third order mode, the L may be several times greater. The requirement for L in dimensions allows a margin one digit greater than that for D. Currently available removal techniques are sufficiently capable of realizing this level of fabrication. This is to say, selection of the fabrication techniques has been wrong. The slit width required to have an extreme thinness should be realized by a film forming technique, and a removal technique should be used for the fabrication of the resonator in a direction of the length allowed to have a dimension larger than the slit width. This Example actually could realize D=1.7 nm without a special technique.

Conventional slits were space without any object filled in. In contrast, in the resonator obtained as above, a part equivalent to a conventional slit is filled with a positive dielectric. As is obvious from the solution to Equation 1, a higher dielectric constant in the slit makes the dispersion curves in the $TM_0$ mode flatter and the wavelength $\lambda_P$ of the surface wave becomes even shorter. Therefore, realizing the slit by a thin film is even more favorable for improving the property. In addition, even if a slit as narrow as a width of 1 nm could be realized by a removal technique, such a minute structure at an atomic level would not be considered to be stable in daily service conditions, and there is a possibility that the fabricated slit deteriorates with time due to covering in the slit by deposition of a substance and atom migration into the slit. From the perspective of stability as an industrial product, it is rational to realize the slit by a thin film.

After realizing a slab waveguide having gold as a cladding by a film forming technique in the way described above, the waveguide was subjected appropriately to processes for admitting light from a certain propagation direction and for forming the length L of the resonator in the propagation direction and the width W of the resonator in a direction orthogonal to the propagation direction. In this study, the area outside of a region to be used for the resonator was removed by focused ion beam. Because the ion beam of the device used here had a diameter of 10 nm, it was capable of forming with a precision at about the same level as this, which was sufficient precision for fabricating the L. In this Example, the end faces in a direction of the width W were fabricated to be open, and thus the width W did not affect the resonance at all. This Example was set at a sufficient value of W=3 μm to obtain sufficient signal intensity for optical property evaluated later. The W also may be other values, and conditions to make the resonator function as a single mode resonator can be obtained particularly by having the W of about 100 nm or less. The L is an important parameter for determining a resonance wavelength $\lambda_0$, and various samples were fabricated in a range from L=55 nm to L=495 nm.

Figure 7:
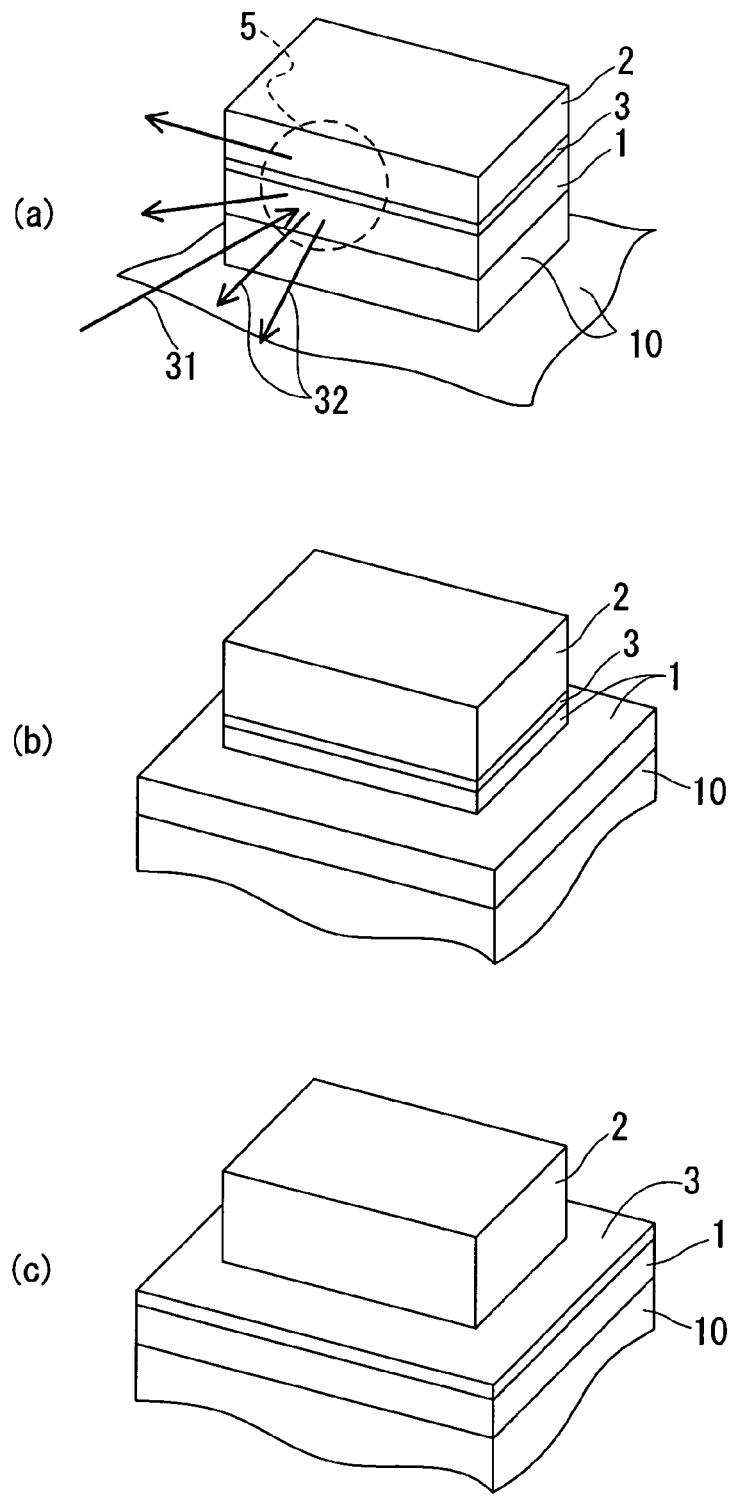
FIG. 7(a) is a perspective view of an open resonator fabricated in an Example below.
FIGS. 7(b) and 7(c) are perspective views of resonators having equivalent functions as the resonator of FIG. 7(a).

A cross-sectional view of the completed open resonator is shown in FIG. 6(b), and a perspective view of the same is in FIG. 7(a). It was fabricated on the outermost part of the synthetic quartz substrate so as to admit light from the side face and to enable measurement of a scattered spectrum.

Although the stacked film was processed down to the depth reaching the synthetic quartz substrate by focused ion beam in this Example for the convenience of the optical property evaluation afterward, the stacked film does not have to be processed as deep as exposing the surface of the synthetic quartz being the substrate 10 because it fully functions as long as negative dielectric (gold) surfaces with a width W and a length L face each other by having a silica film in between. It is sufficient to process the stacked film down to the depth removing at least the second negative dielectric thin film 2 outside of a predetermined region so as to define the predetermined region having a width W and a length L. After this process, the first negative dielectric thin film 1 may be remained in the outside of the predetermined region (FIG. 7(b)) and both the first negative dielectric thin film 1 and the positive dielectric thin film 3 may remain there (FIG. 7(c)).

Figure 8:
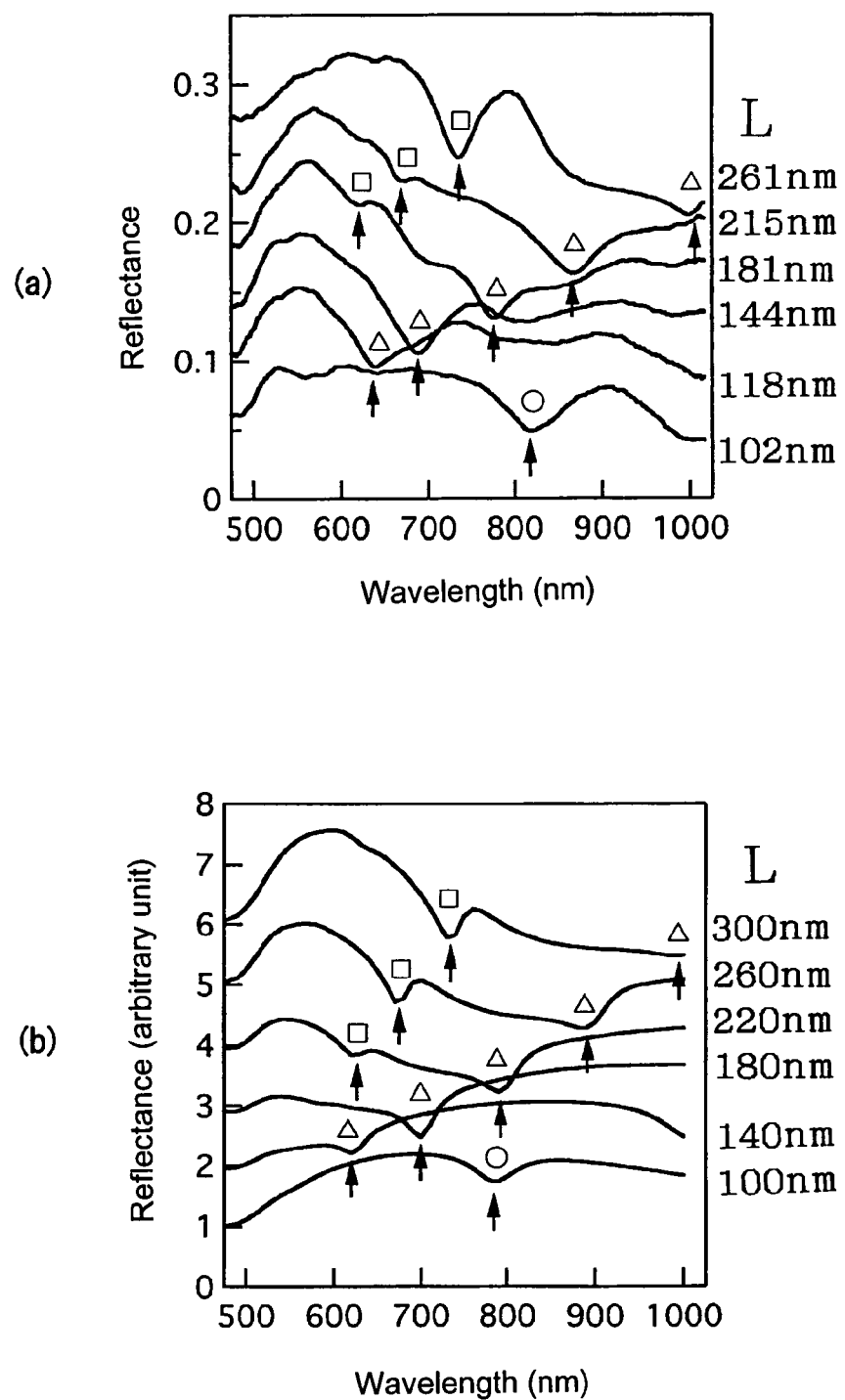
FIG. 8(a) is a chart for showing measurement results of a reflection spectrum of the open resonator fabricated in the Example.
FIG. 8(b) is a chart for showing corresponding calculation results.

The simplest way to check the actual function of the structure thus fabricated as an electromagnetic wave resonator is to measure a reflection spectrum (a backscattering spectrum). FIG. 8(a) shows reflection spectra measured with an epi-illumination type optical microscope, and FIG. 8(b) shows the results of calculation by the two dimensional boundary element method. The figures show an example of D=14 nm.

As shown in FIG. 7(a), in the measurement system, white light from a halogen lamp was almost collimated by the Koehler illumination system, was emitted as an incident light 31 from a side face of the substrate to the sample, and the spectrum distribution of a scattered light 32 from a measurement region 5 was measured by a spectrometer. Specifically, the incident angle distribution was within ±4.6 degrees and the scattered light distribution was within ±33.4 degrees both relative to the perpendicular. Referring to FIGS. 8(a) and 8(b), both results of experiment and calculation showed that the spectrum valleys shifted toward shorter wavelength as the length L of the resonator decreases. In addition, approximate shapes of the spectra were relatively similar to each other, and it was found that the experiment actually developed the expected phenomena. In the cases of the other D values, similar shifts of valleys were observed, and the results of calculation and experiment matched with each other well.

The calculation procedure supplying detailed information such as the electromagnetic field distribution enables to understand actual conditions shown by these valleys. As a result, the valleys with the O-like symbol were understood as resonance by a first surface plasmon, that is a wavelength $\lambda_P$ to fulfill $L=(1/2)\lambda_P$. Similarly, those with the Δ-like symbol and the □-like symbol were equivalent to $L=(2/2)\lambda_P$ being a second resonance and $L=(3/2)\lambda_P$ being a third resonance, respectively.

Although FIGS. 8(a) and 8(b) were placed so as to each valley of experiment was roughly above each corresponding valley of calculation, L values of calculation differed from those of experiment in tens of nanometers when compared strictly. This discrepancy may have resulted from the variations of the D values. Although the value D=14 nm was obtained from observation of a cross-section of the formed film sample by a transmission electron microscope, the D value of the substrate used in the experiment could be different from that used in the measurement because the sample films were formed on a plurality of substrates at one time. In addition, the film thickness at the outer part of each substrate having the resonator fabricated thereon was very likely to be different from that at the center. The actual samples were supposed to have their D values slightly varied from 14 nm.

Second Example

The second Example was to realize a closed resonator under the conditions almost same as the first Example. The same procedure as the first Example was carried out until forming a stacked film of a first negative dielectric thin film (a gold thin film) 1, a positive dielectric thin film (a silica thin film) 3 and a second negative dielectric thin film (gold) 2 on a substrate (a synthetic quartz substrate) 10 and removing the outside by focused ion beam so as to leave the rectangular resonator with a length L' and a width W' (FIG. 9(a)). The length L' and the width W' should be defined rather large in size, such as 500 nm. The depth for removal should be at least so deep as to pass through the second negative dielectric thin film 2.

The substrate was moved into a resistive heating vacuum evaporator to deposit a gold thin film with a thickness of 150 nm as a third negative dielectric thin film 4 (FIG. 9(b)). In this process, the substrate was positioned to be 45 degrees oblique to the orientation of the evaporation source and was deposited from an end face 41 side to be closed, so that only the end face (a closed end) 41 side of the stacked film was terminated with gold but the other end face 42 was kept not to have gold attached. A third negative dielectric thin film 4 may be formed by an inexpensive evaporator because it is not required to be as smooth as the first negative dielectric thin film 1. In this Example, however, for the purpose of tight adhesion of the gold end face processed by the focused ion beam to the interface of gold being deposited later, the substrate was replaced into the evaporator and evacuated within several minutes after taken out of the focused ion beam device to prevent the gold end face from contaminated in the air as much as possible. It is also effective to remove a surface contamination layer by, for example, plasma of oxygen or argon or ozone cleaning right before the deposition.

In practice, gold nanoparticles may wrap around the end face 42 to be left as an open end even when evaporated from an oblique angle. For this reason, the substrate was again replaced into the focused ion beam device to finish the open end. Accordingly, the length L' and the width W' were defined slightly larger than the target dimensions L and W (L'>L and W'>W). When the L is small, 50 nm for example, impinging gold vapor at high temperature on such a thin structure develops thermal stress due to the rapid heating or the rapid cooling and it may result in separation at the interface, with rather weak adhesion by nature, between the gold cladding and the silica thin film. To cope with this possibility, it is preferred to form with the L', which is slightly larger, and then to process to realize the desired L value.

Realizing a highly precision L by two times of focused ion beam processing requires some arrangements. The end face 41 processed at the first processing cannot be recognized virtually by the focused ion beam device for the second processing because it is covered with the gold thin film. To avoid it, an alignment hole mark should be placed near the resonator during the first processing. The second processing should then be started from processing the neighboring area slightly widely to expose the hole mark. The end face 42 was processed precisely along the mark to recess it to a predetermined face 43, and thus a highly precise L was realized.

Figure 9:
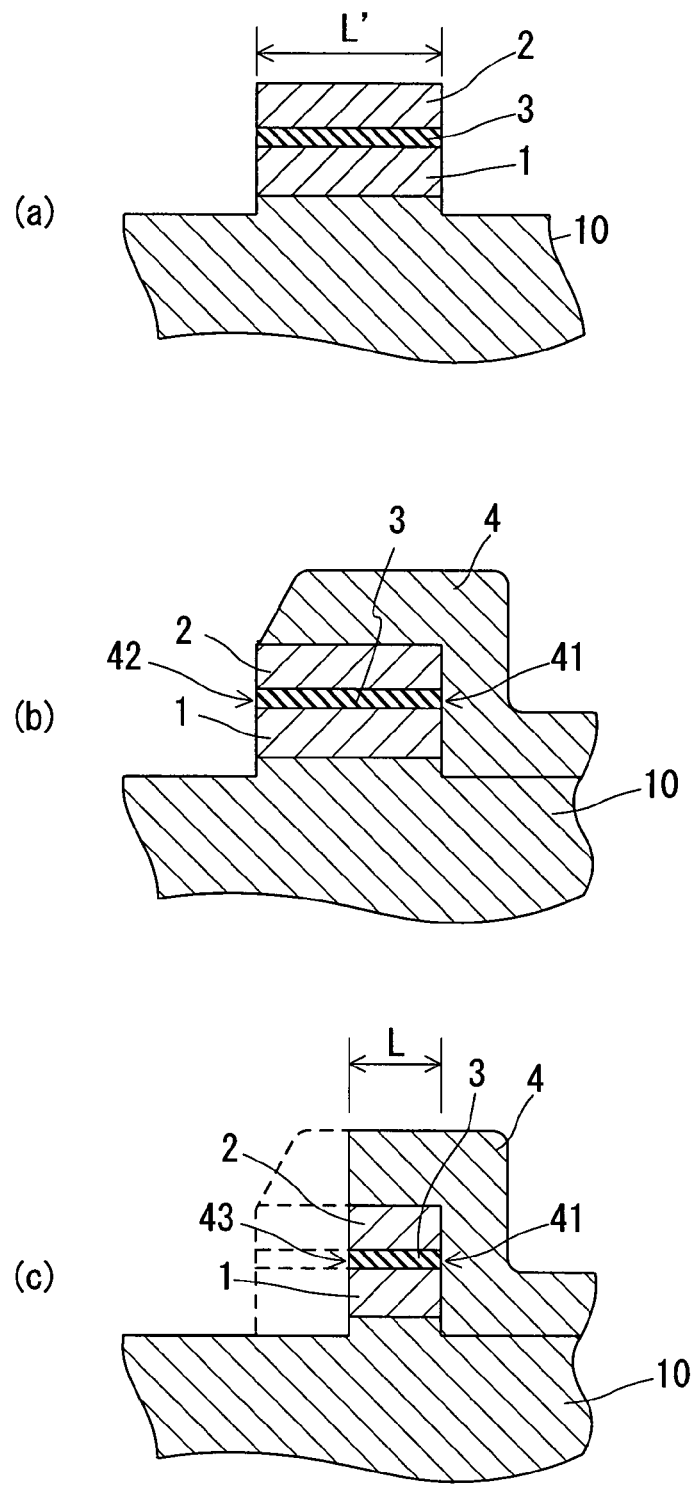
FIGS. 9(a) to 9(c) are cross-sectional views showing steps of manufacturing the closed resonator.

In this way, an electromagnetic wave resonator was obtained that has the positive dielectric thin film 3 with the length L in the principal direction of propagation of the electromagnetic wave, two end faces in this direction in which one of the end faces is the closed end 41 and the other is the open end 43 (FIG. 9(c)). This resonator had the positive dielectric thin film 3 with the length W in a film plane direction orthogonal to the principal direction of propagation of the electromagnetic wave (from the front and to the back of the page of FIG. 9) and had two end faces in the film plane direction in which both of them were made open ends by focused ion beam.

Third Example

In the third Example, a resonator is described that has a plurality of the resonance structures as described in the first and the second Examples aligned therein. It is important for practical use to realize a resonator aligned to interact with electromagnetic waves emitted to a wide region.

A method of manufacturing a resonator having a plurality of open resonator structures aligned therein is illustrated here. First, a multilayer (a multilayer structure) 11 is formed in which a gold thin film with a thickness of 150 nm as a negative dielectric thin film 7 and a silica thin film with a thickness D as a positive dielectric thin film 3 were stack with each other a plurality of times on a synthetic quartz substrate as a substrate 10 (FIG. 10(a)).

Subsequently, the substrate 10 was cut into strips each with a width of, for example, 2 mm. One of the strips was paired with another and the multilayer structure parts were bonded with a hard epoxy resin to be a junction layer 13 facing with each other. Thus, a stacked body was obtained in which the first substrate 10, the first multilayer structure 11, the junction layer 13, a second multilayer structure 12 and a second substrate 20 stacked in this order (FIG. 10(b)).

The reason for bonding the multilayer structures 11 and 12 was because the outer edges were likely to be abraded quicker in a polishing step carried out later. When polished without adhering them, the delicate multilayer structures 11 and 12 are disposed to be the outermost edges and precise polishing becomes difficult. Disposing the multilayer structures 11 and 12 at the center of the material to be polished by adhering them enables easy polishing with a high precision.

Figure 10:
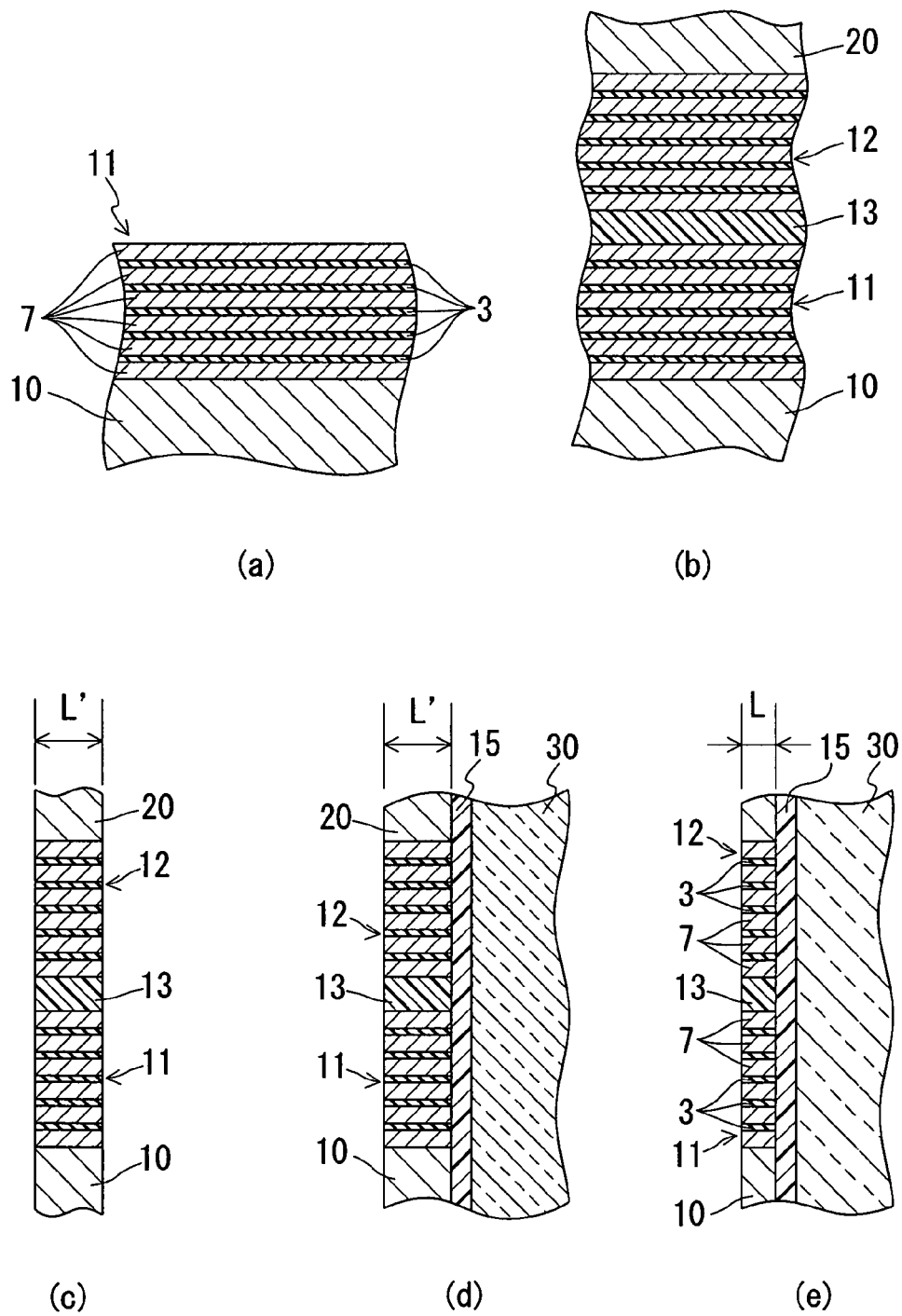
FIGS. 10(a) to 10(e) are cross-sectional views showing steps of manufacturing an open resonator having a multilayer structure.

Further, the stacked body was cut into a thickness of L', for example about 300 µm, and bonded to a polishing jig with hot wax for being polished on one face (FIG. 10(c)). The polishing may be carried out, for example, first with a waterproof abrasive paper and then with diamond paste for mirror finishing. Techniques such as flat milling with argon ions also may be applied.

After that, the stacked body was bonded to a glass substrate as a support member 30 using an adhesive 15 (FIG. 10(d)). The adhesive 15 may be a transparent material such as ultraviolet curable resin. The glass substrate 30 was installed on a polishing device and polished in the same manner as above for reducing the thickness L' to a predetermined thickness L by recessing an end face of the multilayer structures 11 and 12. In this way, an electromagnetic wave resonator was obtained in which the multilayer structures 11 and 12 including a plurality of positive dielectric thin films 3 having the length L in the principal direction of propagation of the electromagnetic wave were joined to the support member 30 on one end face in this direction by the adhesive 15 (FIG. 10(e)).

The thickness L is fabricated preferably as precise as an order of nanometer. For satisfying this condition, a reflection spectrum or a transmission spectrum on the polished face should be measured as appropriate during the polishing to stop polishing when reaching the desired spectrum.

In the resonator shown in FIG. 10(e), both end faces of the positive dielectric thin film 3 in a direction of the principal direction of propagation of the electromagnetic wave (a direction of L) were open ends.

Figure 11:
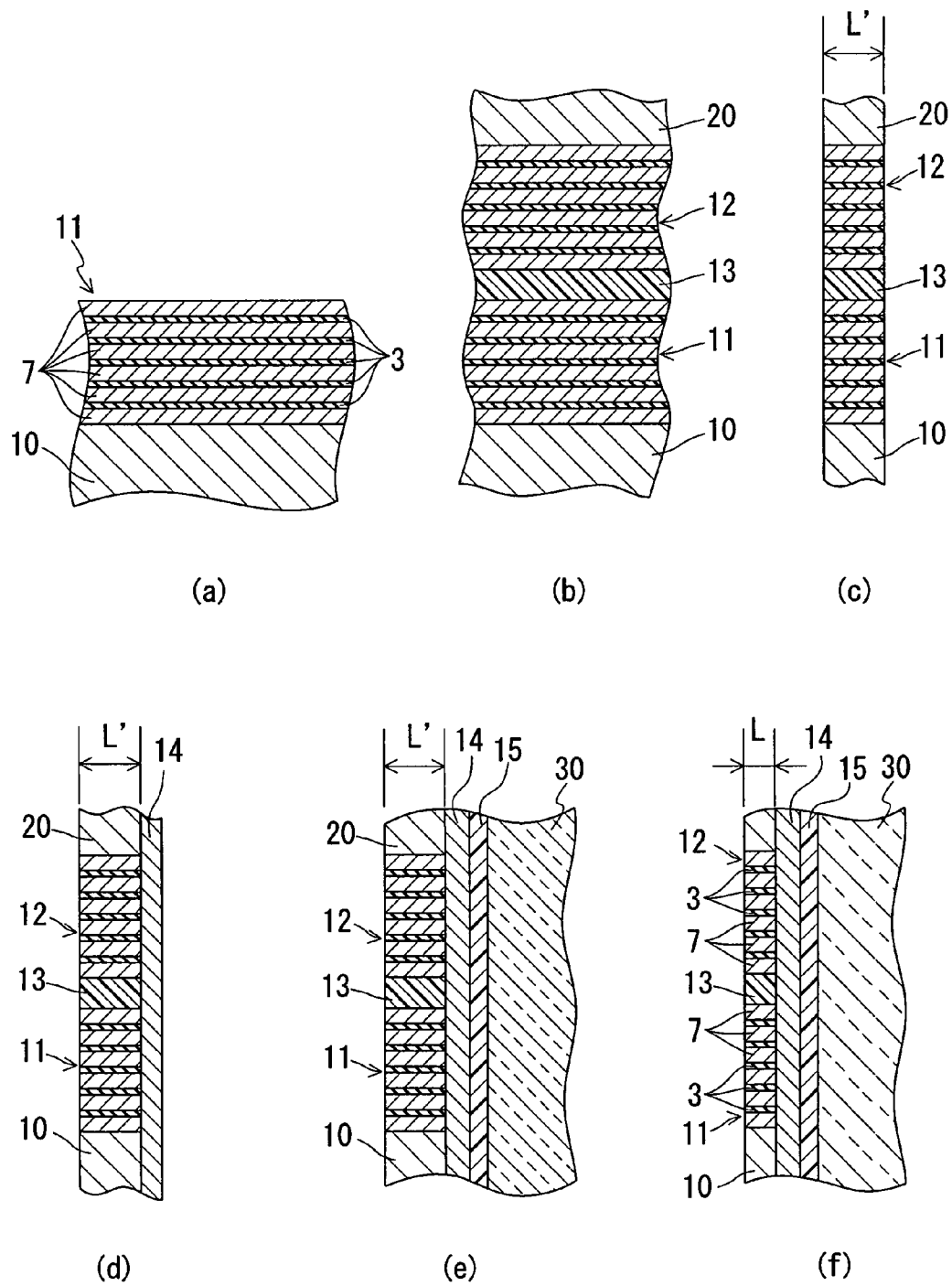
FIGS. 11(a) to 11(f) are cross-sectional views showing steps of manufacturing a closed resonator having a multilayer structure.

A resonator including a plurality of resonance structures having one of the end faces being a closed end can be fabricated in a similar manner as above. First, the same steps are carried out until defining the thickness L' by polishing one face of the multilayer structures 11 and 12 (FIGS. 11(a) to 11(c)). After these steps, for fabricating a closed resonator, gold with a thickness of 150 nm is deposited as a negative dielectric thin film 14 on one of the end faces of the multilayer structures 11 and 12 and thus the end face is made into a closed end (FIG. 11(d)). Afterward, the same steps as above are carried out (FIGS. 11(e) and 11(f)) to complete the resonator. In this Example as well, the thickness L may be defined by mirror polishing while appropriately monitoring the reflection spectrum.

The adhesive 15 and the support member 30 for a closed resonator may be selected without considering transmission of the objective electromagnetic wave. For example, the adhesive 15 may be opaque epoxy resin and the support member 30 may be silicon or metal.

Figure 12:
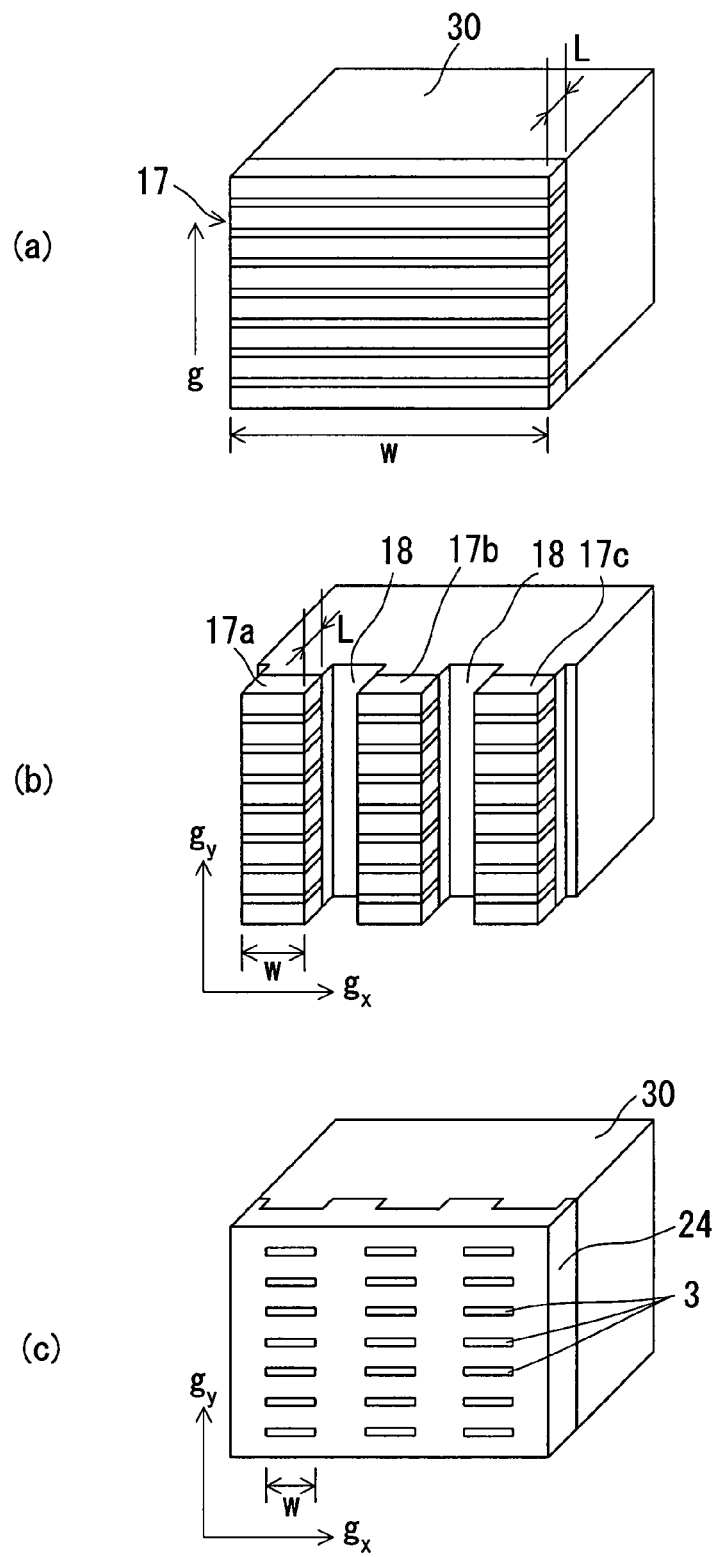
FIGS. 12(a) to 12(c) are perspective views illustrating examples of forms of the resonator having a multilayer structure.

An open or closed resonator thus obtained has a long length W, as shown in FIG. 12(a), which may be considered almost infinite in comparison with the wavelength of light in a direction in the layer plane of the multilayer structure orthogonal to the principal direction of propagation. A structure with a two dimensional array is often practically important in which the multilayer structure is divided in the direction of width.

Such two dimensional arrays are obtained by forming grooves 18 with a depth of L or more from the end face of the multilayer structure 17 and dividing the multilayer structure into a plurality of rows 17a, 17b and 17c through the application of a technique such as a common photolithography followed by an anisotropic etching and mechanical polishing (FIG. 12(b)). In this resonator, three multilayer structures 17a, 17b and 17c are supported by the support member 30 to be spaced apart in a direction orthogonal to the principal direction of propagation in the layer plane direction of the multilayer structure 17. Since the length W does not affect the properties as a resonator much, it does not have to be with very high precision. In this way, a resonator is obtained in which both of the two end faces (both side faces) in the layer plane direction orthogonal to the principal direction of propagation were open ends.

Further, a negative dielectric thin film 24 such as a gold thin film is formed by, for example, sputtering to cover in the groove 18, and the negative dielectric thin film 24 is mirror polished to expose an end face of the positive dielectric thin film 3, and thus a resonator is obtained in which both of the two end faces (both side faces) in the layer plane direction orthogonal to the principal direction of propagation were closed ends (FIG. 12(c)). The chemical mechanical polishing, which is a commonly used polishing method for planarization in semiconductor processes, is an appropriate technique to polish the negative dielectric thin film 24.

The resonator with both side faces being closed ends, shown in FIG. 12(c), is better than the resonator shown in FIG. 12(b) from the perspective of preventing the effects of an adjacent row on the resonator. It is preferable, though, to satisfy a condition that the length W of the positive dielectric thin film 3 in a direction of width is half or more of the vacuum wavelength $\lambda_0$ in a resonator having its both side face being closed ends in order to resonate sufficiently within the positive dielectric thin film 3 to behave as slits.

As described in this Example, in a resonator having a plurality of resonance structures (may be referred to as aligned bodies or an assembly of resonators), there is an important caution for its optical properties. In a periodic array of slits, surface plasmon resonance may be generated in a direction of stacking the multilayer structure (direction of g), and further in an adjacent direction (direction of gx) as well as in a stacking direction (gy) when there is an adjacent resonance structure, in addition to surface plasmon resonance in a direction of the slit width (direction of the length L). The surface plasmon resonance in the directions of g (gy) and gx is resonance by multiple reflection of the surface plasmon traveling on the face the electromagnetic wave being introduced, and the dispersion characteristics of the surface plasmon is expressed by the dispersion curves shown in FIG. 1(b).

In practice, a surface plasmon mode on the incident face and a surface plasmon mode inside the slit are bonded for generating a new resonance state. Even in this case, however, the dispersion characteristics finally obtained also can be obtained by exactly solving the Maxwell's equations. To solve them, a calculation method such as transfer matrix method and multimode expansion method may be used.

In this case, the appropriate depth L of the slit generally does not fall within the conditions of $L=(1/2)\lambda_P$, $(2/2)\lambda_P$, $(3/2)\lambda_P$... and $L=(1/4)\lambda_P$, $(3/4)\lambda_P$, $(5/4)\lambda_P$... according to the slit period and the vacuum wavelength $\lambda_0$. In addition, since the electromagnetic field distribution during the resonance is not as simple as the condition in which the electric field becomes maximal at the open end and zero at the closed end, an area with the maximal voltage is developed in the middle of the depth of the slit. Although the thickness of the gold thin film in the multilayer structure is determined to be 150 nm in the case of aligned body in this Example, the actual period is a sum of this and the thickness D of silica and thus the thickness of gold should be determined appropriately in practice according to the resonance property.

Fourth Example

The fourth Example is a method for realizing a high quality positive dielectric core with a thickness as thin as 1 nm with an excellent precision by combining the techniques currently applicable for industrial use. In the field of semiconductor devices, techniques have been established that manufacture a high quality thin insulating layer (a positive dielectric layer) on a silicon surface by chemical reaction of silicon itself. As the simplest method among those, in this Example, a method is described that uses an oxide film on the silicon surface as the positive dielectric thin film. Since the target thickness is 1 nm, a natural oxide film or an oxide film chemically formed while cleaning may be used as they are without any specific treatment for oxidation. In this method, the silicon substrate functions as a sacrificial substrate.

Figure 13:
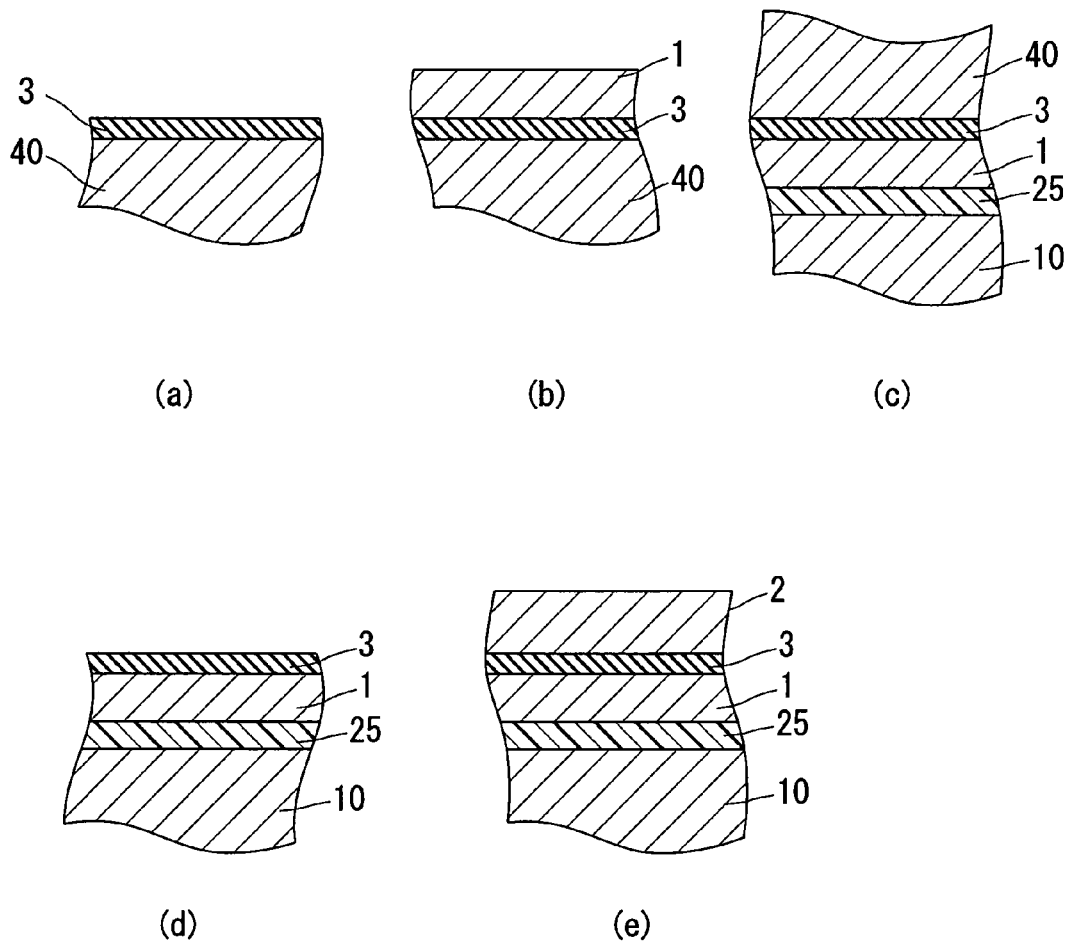
FIGS. 13(a) to 13(e) are cross-sectional views showing steps of manufacturing a resonator using an oxide film on a silicon substrate as the positive dielectric thin film.

First, a silicon substrate (a sacrificial substrate) 40 with a natural oxide film to be a positive dielectric thin film 3 is polished smoothly on its surface (FIG. 13(a)), and a gold thin film with a thickness of 150 nm is formed as a first negative dielectric thin film 1 on the surface of the substrate 40 (FIG. 13(b)). Next, a first negative dielectric thin film 1 is bonded to a substrate (a synthetic quartz substrate) 10 using an epoxy resin as an adhesive 25 (FIG. 13(c)). Then, the silicon substrate 40 is polished mechanically to some extent from a face opposite from the face having the thin films 1 and 3 formed thereon, followed by a treatment in which the silicon substrate 40 is removed with a potassium hydroxide solution, which etches silicon electively, for exposing a surface of the positive dielectric thin film 3 (FIG. 13(d)). At this point, the first negative dielectric thin film (a gold thin film) 1 and the positive dielectric thin film (a silica thin film with a thickness of 1 nm) 3 are remained on the substrate 10.

Lastly, a gold thin film with a thickness of 150 nm as a second negative dielectric thin film 2 is formed on the positive dielectric thin film 3, and thus a stacked film of the first negative dielectric thin film 1, the positive dielectric thin film 3 and the second negative dielectric thin film 2 is obtained (FIG. 13(e)). The use of the silicon substrate as the sacrificial substrate 40 is preferred not only because the technique for forming an insulating layer is established but also because the technique for realizing a planar surface is established. Since smooth interfaces are realized between the positive dielectric thin film 3 and the negative dielectric thin films 1 and 2, losses due to the scattered surface plasmon are reduced when compared to a method of forming a positive dielectric thin film 3 on a negative dielectric thin film 1. The positive dielectric thin film 3 is not limited to be an oxide film but may be, for example, a nitride film on the silicon substrate.

The stacked body thus obtained further can be subjected to semiconductor processes suitable for mass production. First, a photoresist is applied on the stacked body, a pattern is exposed to it and then it is developed to form a resist 45 having a predetermined pattern (FIG. 14(a)). Next, the outside of the pattern is removed except the region right under the pattern by an anisotropic dry etching such as reactive ion etching (FIG. 14(b)), and thus the resist 45 is removed to obtain an open resonator (FIG. 14(c)).

Figure 14:
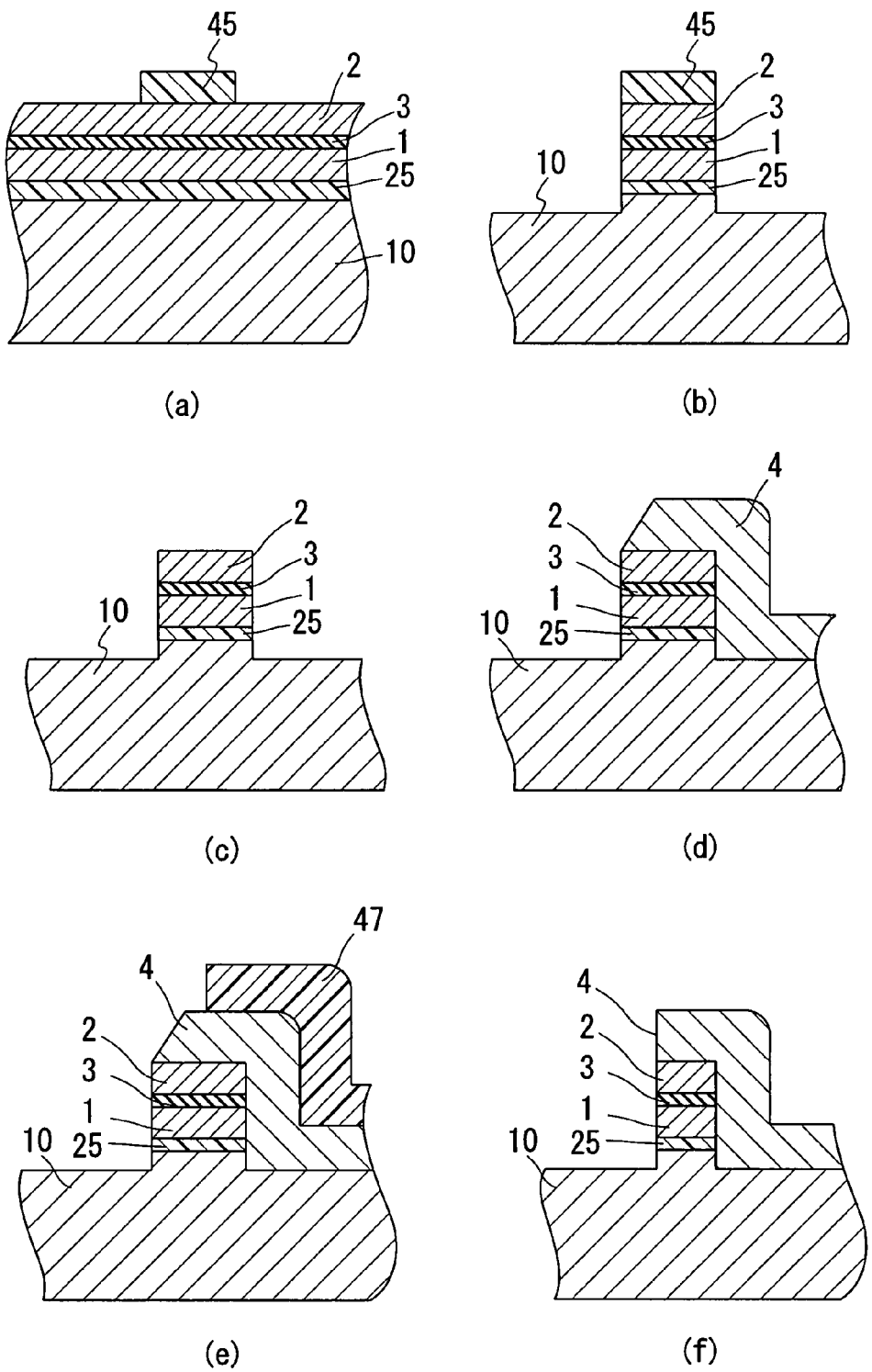
FIGS. 14(a) to 14(f) are cross-sectional views showing steps of manufacturing a resonator; the steps may be carried out assembled subsequently to the steps shown in FIG. 13.

Further, as needed, a negative dielectric thin film (a gold thin film) 4 may be deposited from an oblique direction in the same manner as the second Example (FIG. 14(d)), to carry out a second exposure over the film 4 and patterning a resist 47 on the region to be kept (FIG. 14(e)). After carrying out these procedures, the sample is processed into perpendicular by another anisotropic etching to remove the resist 47 and thus a closed resonator is completed (FIG. 14(f)). The resist, however, does not always have to be removed.

Although the embodiments of the present invention have been described hereinbefore, the present invention can be carried out in various other forms without departing from the spirit thereof.

First, although resonators for electromagnetic waves in the regions from visible light to infrared light are illustrated in the Examples described above where the resonators use gold as a negative dielectric and surface plasmon as a surface wave, a material for the negative dielectric is not particularly limited in which a dielectric constant of a material for a cladding has a negative real part at an objective frequency.

In addition, since the point of the present invention is that a surface wave is confined by reflection at an end face for generating a resonance mode where the surface wave has a wavelength $\lambda_P$ determined by a vacuum wavelength $\lambda_0$, a thickness D of a positive dielectric thin film sandwiched by negative dielectrics and dielectric constants of the positive dielectric and the negative dielectrics, the shape of the positive dielectric core is not necessarily a rectangular face determined by a length L and a width W. For example, in the case of this face being a core having a trapezoidal shape in which the L gradually changes, the resonance mode also changes and it enables adjusting of a bandwidth for resonance. A similar effect is expected by inserting steps of patterning and etching once right after forming the positive dielectric thin film to vary the thickness D depending on a part of the thin film. These are nothing but other forms of the present invention.

Although, as a resonator including arrays, one that has a constant period of thin film is illustrated above for the convenience, a system having a gradually varying period and a system having each resonator in which the dimensions gradually vary also can be realized, and they are nothing but other examples of the present invention as well. Such structure is particularly useful in reality as an array having variously characterized resonators aligned therein. Specifically, it can be realized by gradually varying a thickness of each thin film of gold and silica.

The present invention may include other various changes that come with the meaning of the invention, and the foregoing description is not intended to exclude all of them from the scope of the invention.

INDUSTRIAL APPLICABILITY

The present invention has a great value for application by providing an industrially mass producible resonator using a surface wave typically as surface plasmon.

The invention claimed is:

1. An electromagnetic wave resonator, comprising a first negative dielectric surface, a second negative dielectric surface and a positive dielectric thin film disposed between the first and the second negative dielectric surfaces,
   wherein the positive dielectric thin film has an end face having an electromagnetic wave introduced therefrom, and
   intensity of the electromagnetic wave having a predetermined wavelength and being introduced from the end face is enhanced in the electromagnetic wave resonator due to resonance of a surface wave having an electric field component in a direction of film thickness of the positive dielectric thin film and without having a cut-off frequency.

2. An electromagnetic wave resonator, comprising a first negative dielectric surface, a second negative dielectric surface and a positive dielectric thin film disposed between the first and the second negative dielectric surfaces,
   wherein the positive dielectric thin film has an end face having an electromagnetic wave introduced therefrom, and
   a length L, the length L being a length in a principal direction of propagation of the electromagnetic wave in a region having the positive dielectric thin film sandwiched between the first and the second negative dielectric surfaces, is set such that an absolute value of a difference ($L-L_0$) between the length L and a length $L_0$ falls within a range of 50% or less of the length $L_0$, the length $L_0$ being a length in the principal direction of propagation and maximizing electromagnetic energy stored in and around the positive dielectric thin film by a surface wave, the surface wave being generated by incidence of an electromagnetic wave with a predetermined wavelength from the end face, having an electric field component in a direction of film thickness of the positive dielectric thin film, and without having a cut-off frequency.

3. The electromagnetic wave resonator according to claim 2, wherein the length L is set such that the absolute value of the difference ($L-L_0$) falls within a range of 30% or less of the length $L_0$.

4. The electromagnetic wave resonator according to claim 1, wherein the positive dielectric thin film has two faces both uncovered with a negative dielectric, the two faces determining a length L (the length L) in the principal direction of propagation of the electromagnetic wave in the region having the positive dielectric thin film sandwiched between the first and the second negative dielectric surfaces.

5. The electromagnetic wave resonator according to claim 2, wherein the positive dielectric thin film has two faces both uncovered with a negative dielectric, the two faces determining the length L, and the length $L_0$ is $(n_1/2)\lambda_P$, wherein $n_1$ denotes a natural number and $\lambda_P$ denotes a wavelength of the surface wave.

6. The electromagnetic wave resonator according to claim 1, wherein the positive dielectric thin film has two faces, the two faces determining a length L (the length L) in the principal direction of propagation of the electromagnetic wave in the region having the positive dielectric thin film sandwiched between the first and the second negative dielectric surfaces, and either one face selected from the two faces is covered with a negative dielectric.

7. The electromagnetic wave resonator according to claim 2, wherein the positive dielectric thin film has two faces determining the length L, either one face selected from the two faces is covered with a negative dielectric, and the $L_0$ is $((2n_2-1)/4)\lambda_P$, wherein $n_2$ denotes a natural number and $\lambda_P$ denotes a wavelength of the surface wave.

8. The electromagnetic wave resonator according to claim 1, wherein the positive dielectric thin film has two end faces both covered with a positive dielectric, the two end faces being in a film plane direction of the positive dielectric thin film and in a direction orthogonal to a principal direction of propagation of the electromagnetic wave.

9. The electromagnetic wave resonator according to claim 1, wherein the positive dielectric thin film has two end faces, the two end faces being in a film plane direction of the positive dielectric thin film and in a direction orthogonal to a principal direction of propagation of the electromagnetic wave, and at least one end face selected from the two faces is covered with a negative dielectric.

10. The electromagnetic wave resonator according to claim 9, wherein the positive dielectric thin film has a length W in the orthogonal direction, and the length W is half or more of a vacuum wavelength $\lambda_0$ of the electromagnetic wave.

11. The electromagnetic wave resonator according to claim 1, comprising:

two or more positive dielectric thin films, each being the positive dielectric thin film as recited in claim 1 or 2; and a multilayer structure in which the positive dielectric thin films and two or more negative dielectric thin films are stacked alternately.

12. The electromagnetic wave resonator according to claim 11, wherein a thickness of each positive dielectric thin film is less than a thickness of each negative dielectric thin film.

13. The electromagnetic wave resonator according to claim 11, wherein the resonator includes, as the multilayer structure, a first multilayer structure and a second multilayer structure, and the electromagnetic wave resonator includes a first substrate, the first multilayer structure, a junction layer, the second multilayer structure and a second substrate, being stacked in this order.

14. The electromagnetic wave resonator according to claim 11, further comprising a support member joined to at least one end face selected from two end faces of the multilayer structure, the two end faces being in a principal direction of propagation of the electromagnetic wave.

15. The electromagnetic wave resonator according to claim 14, wherein the multilayer structure includes a third multilayer structure and a fourth multilayer structure, and the third and the fourth multilayer structures are supported by the support member to be spaced apart in a layer plane direction of the multilayer structure and in a direction orthogonal to the principal direction of propagation.

16. The electromagnetic wave resonator according to claim 1, wherein the positive dielectric thin film has a thickness D of 1/10 or less of a vacuum wavelength $\lambda_0$ of the electromagnetic wave.

17. The electromagnetic wave resonator according to claim 1, wherein the positive dielectric thin film has a thickness D of 10 nm or less.

18. The electromagnetic wave resonator according to claim 17, wherein the thickness D of the positive dielectric thin film is in a range from 0.2 nm to 5 nm.

19. The electromagnetic wave resonator according to claim 1, wherein a length L (the length L) in the principal direction of propagation of the electromagnetic wave in the region having the positive dielectric thin film sandwiched between the first and the second negative dielectric surfaces is equal to or less than a vacuum wavelength $\lambda_0$ of the electromagnetic wave.

20. The electromagnetic wave resonator according to claim 1, wherein a length L (the length L) in the principal direction of propagation of the electromagnetic wave in the region having the positive dielectric thin film sandwiched between the first and the second negative dielectric surfaces is 1 μm or less.

21. The electromagnetic wave resonator according to claim 20, wherein the L is in a range from 1 nm to 200 nm.

22. The electromagnetic wave resonator according to claim 1, wherein the electromagnetic wave has a vacuum wavelength $\lambda_0$ being in a range from 100 nm to 10 mm.

23. The electromagnetic wave resonator according to claim 22, wherein the vacuum wavelength $\lambda_0$ of the electromagnetic wave is in a range from 300 nm to 4 μm.

24. The electromagnetic wave resonator according to claim 1, wherein each of the first and the second negative dielectric surfaces is provided with a negative dielectric substrate or a negative dielectric thin film.

25. An assembly of electromagnetic wave resonators, comprising two or more electromagnetic wave resonators, each resonator being according to claim 1, wherein the two or more electromagnetic wave resonators are aligned on a plane orthogonal to the principal direction of propagation of the electromagnetic wave.

26. A method of manufacturing the electromagnetic wave resonator according to claim 1, comprising:
    forming a positive dielectric thin film on a first negative dielectric surface;
    forming a negative dielectric thin film on the positive dielectric thin film for providing a second negative dielectric surface; and
    removing a part of the negative dielectric thin film from a region having the negative dielectric thin film formed thereon.

27. A method of manufacturing the electromagnetic wave resonator according to claim 1, comprising:
    forming a first negative dielectric thin film providing a first negative dielectric surface on a positive dielectric thin film, the positive dielectric thin film being formed on a sacrificial substrate;
    removing the sacrificial substrate so as to expose a surface of the positive dielectric thin film; and
    forming a second negative dielectric thin film providing a second negative dielectric surface on the exposed surface of the positive dielectric thin film.

28. A method of resonating an electromagnetic wave having a predetermined wavelength using an electromagnetic wave resonator, the resonator comprising a positive dielectric thin film disposed between a first and a second negative dielectric surfaces, the method comprising:
    introducing the electromagnetic wave from an end face of the positive dielectric thin film to the electromagnetic wave resonator so as to generate a surface wave in the electromagnetic wave resonator, the surface wave having an electric field component in a direction of film thickness of the positive dielectric thin film and without having a cut-off frequency and to enhance intensity of the electromagnetic wave in the electromagnetic wave resonator due to resonance of the surface wave.

29. The method of resonating an electromagnetic wave according to claim 28,
    wherein the electromagnetic wave resonator includes two or more of the positive dielectric thin films, and
    the method introduces the electromagnetic wave into the two or more positive dielectric thin films.

30. The method of resonating an electromagnetic wave according to claim 29, wherein the electromagnetic wave resonator has a multilayer structure having the positive dielectric thin films and negative dielectric thin films stacked alternately.

31. The electromagnetic wave resonator according to claim 5, wherein $n_1$ is a natural number equal to or less than six.

32. The electromagnetic wave resonator according to claim 7, wherein $n_2$ is a natural number equal to or less than six.

* * * * *